United States Patent
Brand et al.

(10) Patent No.: US 10,837,621 B2
(45) Date of Patent: Nov. 17, 2020

(54) METHODS AND SYSTEMS FOR FREEFORM IRRADIANCE TAILORING FOR LIGHT FIELDS

(71) Applicant: Mitsubishi Electric Research Laboratories, Inc., Cambridge, MA (US)

(72) Inventors: Matthew Brand, Newton, MA (US); Daniel Birch, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 16/258,091

(22) Filed: Jan. 25, 2019

(65) Prior Publication Data
US 2020/0240611 A1 Jul. 30, 2020

(51) Int. Cl.
*F21V 5/04* (2006.01)
*F21V 7/04* (2006.01)

(52) U.S. Cl.
CPC ............... *F21V 5/04* (2013.01); *F21V 7/048* (2013.01)

(58) Field of Classification Search
CPC .................... F21V 5/04; F21V 7/048
See application file for complete search history.

(56) References Cited

U.S. PATENT DOCUMENTS

| | | | | |
|---|---|---|---|---|
| 2005/0086032 A1* | 4/2005 | Benitez | ............. | G02B 19/0033 703/1 |
| 2009/0040769 A1* | 2/2009 | Parkyn | ............... | G02B 19/0014 362/310 |
| 2015/0127304 A1* | 5/2015 | Cassarly | ............ | G02B 27/0012 703/1 |
| 2015/0234941 A1* | 8/2015 | Xiong | .................... | G06F 30/00 703/2 |
| 2015/0362725 A1* | 12/2015 | Zhu | .................... | G02B 19/0061 703/2 |
| 2017/0329145 A1* | 11/2017 | Brand | ................ | G02B 19/0033 |

OTHER PUBLICATIONS

Berry et al. Laplacian Magic Windows, J. Opt. 19 (2017) 06LT01 (5pp). H H Wills Physics Laboratory, Tyndall Avenue, Bristol BS8 1TL, United Kingdom. https://doi.org/10.1088/2040-8986/aa6c4e.
Damberg et al. "High Brightness HDR Projection Using Dynamic Freeform Lensing." ACM Transactions on Graphics 35(3)1-11—May 2016.
Ries et al., "Tailored Freeform Optical Surfaces" J. Opt. Soc. Am. A/vol. 19, No. 3/Mar. 2002. pp. 590-595.

(Continued)

*Primary Examiner* — Zheng Song
(74) *Attorney, Agent, or Firm* — Gennadiy Vinokur; James McAleenan; Hironori Tsukamoto

(57) ABSTRACT

Devices, systems and methods including an optic having an optical surface partitioned into a plurality of facets. Wherein a geometry of the plurality of facets are configured to rearrange the rays in an incident light field to form a desired irradiance pattern on a projection surface, partitioned into a plurality of pixels, each of which may receive light from a multiplicity of facets. Wherein the configured geometry of the plurality of facets is corrected to minimize a difference between an observed irradiance pattern and a desired irradiance pattern provided by a user.

17 Claims, 12 Drawing Sheets

(56) References Cited

OTHER PUBLICATIONS

C.R. Prins, J.H.M. ten Thije Boonkkamp, J. van Roosmalen, W.L. IJzerman, T.W. Tukker., "A numerical method for the design of free-form reflectors for lighting applications " CASA-Report Sep. 13-22, 2013 Eindhoven University of Technology Department of Mathematics and Computer Science, Centre for Analysis, Scientific computing and Applications Department of Mathematics and Computer Science Eindhoven University of Technology P.O. Box 513 5600 MB Eindhoven, The Netherlands ISSN: 0926-4507.

Schwartzburg et al., "High-contrast computational caustic design" ACM Transactions on Graphics (TOG) TOG Homepage, vol. 33 Issue 4, Jul. 2014, Article No. 74.

Wester et al., "Designing optical free-form surfaces for extended sources" Opt Express. Mar. 10, 2014;22 Suppl 2: A552-60. doi: 10.1364/OE.22.00A552.

\* cited by examiner

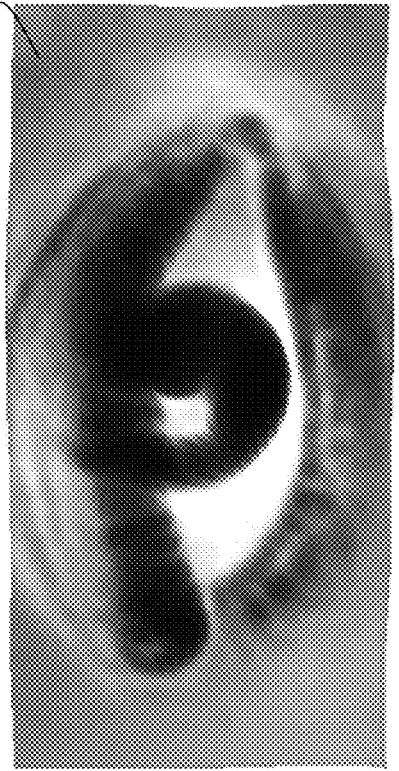
FIG. 3D
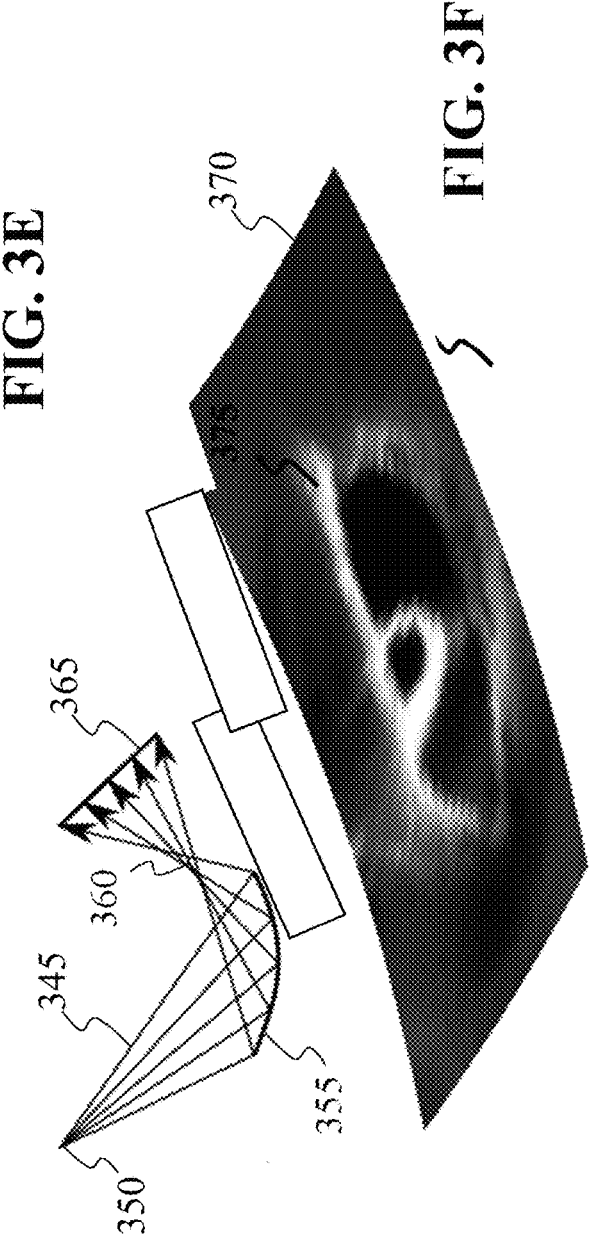
FIG. 3E
FIG. 3F

METHODS AND SYSTEMS FOR FREEFORM IRRADIANCE TAILORING FOR LIGHT FIELDS

FIELD

The present disclosure relates generally to optics, and more specifically to optics having a freeform optical surface transforming incident light to produce an illumination pattern.

BACKGROUND

The state of the art of conventional methods for designing freeform illumination optics can be divided into those that rely on the mathematical fiction of an ideal light source (i.e., a zero-étendue beam from a hypothetical point source, usually located infinitely far away to provide collimation) and those for extended light sources (e.g., positive-étendue beams from actual extended light sources, usually light emitting diodes located nearby).

Some conventional methods for freeform design for ideal light sources include ray mapping, Monge-Ampere solutions, and a Supporting Quadric Method. In principle, optics designed via these methods can convert unstructured idealized beams into highly detailed illumination patterns on a projection surface. Such patterns are called "irradiance images," and can in principle surpass photographs in detail, tonal grading, and contrast. However, when optics designed via these conventional methods and similar methods are used with real extended light sources, they produce blurry illumination patterns. Generally, these blurred patterns do not meet the needs and requirements of today's illumination technologies.

Some conventional methods for non-ideal (extended) light sources include simultaneous multiple surfaces in their three-dimensional version (SMS3D), optimization-based design, and feedback design. SMS3D requires at least two optical surfaces to create a desired illumination pattern, and while SMS3D provides limited control of the illumination boundary, it does not provide control of the illumination density inside the boundary. Further, neither optimization-based design methods nor feedback design methods are able to produce detailed illumination patterns, such as letters and graphics, from extended light sources. These conventional methods were developed for and are used for producing simple illumination patches, e.g., uniformly illuminated disks or rectangles, typically with blurry edges. Further, most of these conventional methods assume a single square or disk-shaped light source, and do not generalize to other shapes, such as notched LED dies, or to multiple light sources.

More generally, none of these conventional methods can handle light fields.

Accordingly, there is need for an optic that can transform incident light from the spatially extended light source or light field by designing a lens or mirror surface that reorganizes a field of light rays to project a highly structured pattern of light onto a surface, such as a graphic or a sign.

SUMMARY

The present disclosure relates generally to optics, and more specifically to optics having an optical surface or a freeform optical surface, transforming incident light to produce an illumination pattern.

Aspects of the present disclosure address solving the conventional problems of tailoring an optical surface to form a prescribed target irradiance pattern from an incident light field, by exploiting an exchangeability relationship between optical surfaces and wavefronts. The intensity of light on the projection surface is determined in a complementary manner by the local curvatures of the optical surface and of the wavefront. Wherein the present disclosure exploits this relationship to isolate local corrections to the optical surface from global errors in the wavefront. Based on experimentation, the present disclosure overcomes the conventional problems of unacceptable blurry target irradiance patterns from poorly tailored optical surfaces, to produce acceptable un-blurred illumination patterns.

Some embodiments of the present disclosure use a surface-correcting algorithm that accommodates a base surface, any twice-differentiable incident wavefront, and a projection surface that can be flat or curved or even discontinuous. Wherein a base surface is an initial surface that will be minimally altered to attain the desired illumination pattern; and a twice-differentiable incident wavefront is the frontier of light emanating from the source, considered at the instant when it reaches the freeform surface, wherein the frontier is itself considered as a surface that has finite local slope and curvature. During experimentation, the surface-correcting method was found to design optical surfaces that transform source radiance fields into target illumination fields with high fidelity and contrast ratios. Wherein the source radiance field is the spatial pattern of light intensity associated with the incident wavefront; and a target illumination field is the pattern of light desired on the projection surface(s).

By exchanging the roles of the source and the target fields, a generalized tailoring algorithm can be obtained that accommodates arbitrary incident light fields, including multiple and/or extended light source(s). In this exchange, the physics of the system is simulated backward, with points on the projection surface emitting fictive spherical wavefronts that propagate backwards thought the freeform optic to the actual extended light source, where the amount of fictive light emitted backwards is compared with the amount of real light emitted forwards in the opposite direction. From many such comparisons it is determined what regions of the freeform optical surface are to be modified and by how much.

Some embodiments of the present disclosure include the design of lens or mirror surface that reorganizes a field of light rays to project a highly structured pattern of light onto a surface, e.g., a photograph or a sign. Most conventional prior art methods assume that the light rays are all emitted from an infinitesimal point. Some conventional prior art methods assume that the rays are emitted from a disc or square, and that if the edge rays are controlled, the rest of the light will do something reasonable, because all remaining rays will strike the projection surface somewhere between the edge rays. However, aspects of the present disclosure through experimentation, had the realization that these unrealistic assumptions by these conventional methods lead to physical illumination systems with low efficiency and poor rendering of the desired illumination pattern. Poor rendering is obtained when the extended light source is close to the freeform, because proximity of the source ensures that a wide cone of light passes through each point on the optical surface, producing significant blurring on the projection surface. Low efficiency is obtained when the light source is not close to the optical surface, because most of the emitted light entirely misses the optical surface.

Another realization of the present disclosure, is that after using fictive reverse wavefronts to tabulate fluxes from the light field to individual points on the projection surface, illumination errors due to defects in the shape of the optical surface can be teased apart from illumination errors due to the blurring effect of the light source, yielding corrections to the optical surface's field local curvatures. Each observed flux measures the amount of light energy emitted from the light field and redirected by a small patch of the optical surface to strike a small patch of the projection surface. If we measure fluxes for a suitable set of patch-pairs on the two surfaces, the measurements can be rearranged into a set of linear equations whose solution indicates how local curvatures of the optical surface should be corrected. Upon further experimentation, aspects of the present disclosure later realized that this provides for high efficiency and high rendering clarity, among other benefits.

In other words, the problem of freeform illumination design, in its broadest form, is to make an optic that converts a field of light rays into an illumination pattern on some surface or surfaces. The forward problem, i.e. simulation, is well understood. For example, a unique bundle of light rays strikes each point on the optical surface, the optical surface uniquely alters each bundle, and the superposition of all the altered bundles at a projection surface yields an illumination pattern. Mathematically, this is a non-stationary convolution. However, the inverse problem, i.e. design, is not well understood. Mathematically, there is not enough information to deconvolve (tease apart) the contributions of the optical surface and the incident light field, nor to determine improvements to the optical surface from the deconvolution, were it available. In short, the problem is ill-posed. In other words, if some part of the projected pattern is wrong, it was not known what part of the optical surface should be modified, or how.

To get around this problem, most conventional freeform design methods rely on the fiction that each point on the optical surface controls only one ray of light; equivalently, that the incident wavefront has zero étendue (entropy). In principle, such conventional methods offer total control over the illumination pattern, but naturally does not allow point light sources. In practice, these conventional methods are demonstrated with low-étendue beams obtained by filtering light through a very small aperture, resulting in extremely low efficiencies. Thus, these types of conventional methods were not further pursued.

Some conventional design methods rely on two less egregious fictions, i.e. that each point on the optical surface controls a simple cone of rays, and that if the rays at the edge of the cone are properly managed, the interior rays will do something reasonable. According to this conventional thinking, these edge rays are presumed to come from the borders of extended light source of simple convex shape, e.g., a square light-emitting diode. Such conventional methods offer far less control over the illumination pattern. Realistic conventional lighting systems are often unkind to these two fictions, for example, the incident light cones may have no clear boundaries; the energy density inside the cones may be significantly variable; there may be more than one light source, also the light may be collected by reflectors before being passed to the optic. In practice, such conventional systems demonstrate poor control of the illumination pattern and/or low efficiencies. Thus, these types of conventional methods were also not further pursued.

However, according to some embodiments of the present disclosure, at least one key insight or realization, among many, is that: (1) one can obtain a correction to the optical surface by performing a deconvolution in the curvature domain instead of the energy domain, and (2) the well-understood simulation procedure, applied backwards, produces enough information to make the curvature deconvolution well posed. Wherein the curvature domain is space of possible fields of local surface curvature, the energy domain is the space of possible fields of flux densities, and a field is an assignment of quantities to each point in a mathematical space.

The correction process, according to the present disclosure, can be iterated to design a freeform lens or mirror that transforms an arbitrarily complicated light field into a highly structured illumination image. Wherein an arbitrarily complicated light field can be any specification of the intensity of light that depends only on 3D position and direction. As much as is physically possible, this optic according to the present disclosure can control both a shape and density of the illumination pattern. Wherein the shape is the boundary of the illuminated area and the density is the intensity of light incident on any point inside the boundary. In practice, the methods and systems according to the present disclosure provide freeform illumination systems that project detailed light patterns with much higher clarity and efficiency than the current state of the art of conventional methods. The higher clarity of the present disclosure can be obtained because it makes no false assumptions about the structure of the incident light (as assumed by conventional methods) nor does it depend on paraxial approximations (also assumed by conventional methods). Consequently, the present disclosure can design optical surfaces for very short optical paths where the light source is very close to the freeform, yielding high efficiencies. Further efficiencies can be obtained by placing ancillary optics before and after the freeform, to collect and direct more light than allowed by the fictive frameworks; among other aspects, the present disclosure can compensate for the effects of these ancillary optics.

Aspects of the present disclosure includes methods and systems for an optic having a freeform optical surface that transforms incident light emitted by a positive-étendue light source to form a prescribed illumination pattern, wherein the freeform optical surface is shaped by surface corrections that remedy defects in the curvature of the wavefront. Other aspects of the present disclosure include fabricating an optic, wherein a freeform optical surface of the optic transforms incident light into an illumination pattern. To create a desired illumination pattern, some embodiments of the present disclosure only require a single optical surface whereas, conventional methods, such as SMS3D requires at least two optical surfaces to create a desired illumination pattern. Also noted, is that SMS3D does not provide control of the illumination density along with very limited control of illumination boundary (i.e. to a degree that does not meet the standards of the present disclosure), whereas some embodiments of the present disclosure provide complete control of both, i.e. control of the illumination density and control of illumination boundary, insofar as the laws of physics allow.

According to an embodiment of the present disclosure, an optic, including an optical surface partitioned into a plurality of facets. Wherein a geometry of the plurality of facets are configured to rearrange the rays in an incident light field to form a desired irradiance pattern on a projection surface, partitioned into a plurality of pixels, each of which may receive light from a multiplicity of facets. Wherein the configured geometry of the plurality of facets is corrected to minimize a difference between an observed irradiance pattern and a desired irradiance pattern provided by a user.

According to an embodiment of the present disclosure, a method of forming an optic device, including providing an optical surface having a plurality of facets with an initial geometry. Using a processor in communication with a memory/The processor is configured for determining a refraction or reflection of incident illumination from an incident light field through the plurality of facets with the initial geometry to create an observed irradiance pattern on a specified projection surface. Determining a shape of each facet of the plurality of facets that results in producing a target irradiance pattern on the specified projection surface correcting a difference between the observed irradiance pattern and a desired irradiance pattern provided by a user.

According to an embodiment of the present disclosure, an optic, including an optical surface partitioned into a plurality of facets. Wherein the partitioning of the optical surface into the plurality of facets is determined by conceptually imposing a grid on the optical surface. Such that each cell of the grid contains one facet and defines an aperture through which a unique subset of rays in the light field propagates to a projection surface, and the projection surface is partitioned into a plurality of non-overlapping equal-area pixels. Wherein a geometry of the plurality of facets are configured to rearrange the rays in an incident light field to form a desired irradiance pattern on the projection surface, partitioned into the plurality of non-overlapping equal-area pixels, each of which may receive light from a multiplicity of facets. Such that the configured geometry of the plurality of facets is corrected to minimize a difference between an observed irradiance pattern and a desired irradiance pattern provided by a user, and that the desired irradiance pattern is specified by intensity values in an image that has been mapped onto the projection surface.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIGS. 3A, 3B, 3C, 3D, 3E, and 3F are schematics illustrating two mirrors that produce photographic projections, demonstrating the ability to implement, transforms the mirror at right reflects at a 45 degree angle and forces all rays to cross so that the beam fits through a small aperture; greyscale texture on the black mirror surfaces indicates local curvature, according to embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Figure 1A:
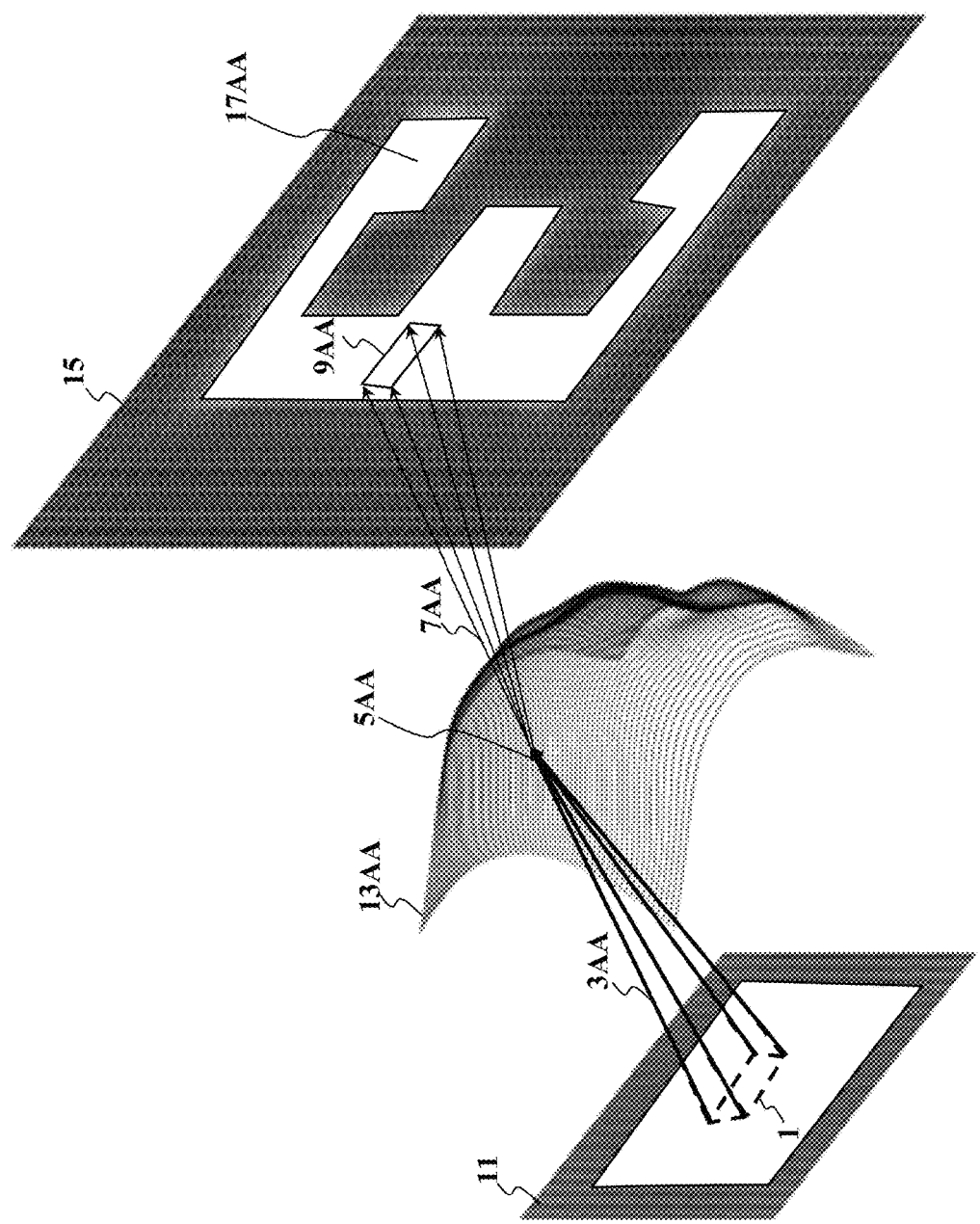
FIG. 1A is a schematic diagram illustrating a large double LED (at left) producing a light field that is incident on an optical surface (middle, depicted with parallel lines on the surface to convey curvature) that is shaped to convert the spatial distribution of light in the incident light field to form a target irradiance pattern, specified as an image on a projection surface (at right), according to embodiments of the present disclosure.

FIG. 1A is a schematic diagram illustrating a large double LED (left) having subsets of an incident light field illuminating a geometry of a plurality of facets of an optical surface (middle) configured to convert the subsets of an incident light field to form a target irradiance pattern, cast on pixels of a specified projection surface, i.e. projection surface, according to embodiments of the present disclosure.

Some embodiments of the present disclosure provide a general solution for the irradiance tailoring problem for a considerably wider range of sources, and demonstrate pictorial illumination with large extended light sources, steep slopes, and short focal length. In regard with a zeroétendue case, shown are corrections to the optical surface that can be determined directly from beam dilation errors, as revealed by comparing the target irradiance with an actual radiance or irradiance, when these fields are suitably unwarped to the optical surface. In practice, this reduces to a ray-trace and an FFT.

Through experimentation, some processes then generalize to an arbitrary incident light field (plenoptic function). This includes multiple extended light sources of arbitrary shape and directionality. At least one historical difficulty is that irradiance is a nonstationary convolution of the light field and the optical surface ray-mapping function. At least one realization gained is that by exchanging the roles of the radiant and irradiant surfaces, the problem can be decomposed into a superposition of spherical wavefronts, such that the freeform's curvature errors can be isolated by solving a sparse system of linear equations. Where étendue or optical path physics do not allow an exact solution, the method of the present disclosure can approximate the target irradiance. At least one resulting method of some embodiments of the present disclosure can be simple, fast, and versatile accommodating nontrivial wavefronts, optical paths, and transport phenomena, over conventional methods that are more complicated, and take more computational costs & time. Specifically, the methods of the present disclosure when compared to conventional methods, provide less computational time and expense by having simple, fast, and versatile approaches that can accommodate nontrivial wavefronts, optical paths, and transport phenomena, i.e. very complicated problems. Other advantages over the conventional methods is that the embodiments of the present disclosure provide a design of highly efficient and compact freeform illumination systems, with unprecedented control over the projected irradiance pattern.

Some embodiments of the present disclosure generally relate to a transparent or reflective surface (such as a milled acrylic or aluminum, respectively) that projects a desired image when illuminated, as well as to techniques for designing such a surface. For example, aspects of the present disclosure provide an optical surface configuration that is partitioned, for the purposes of design and manufacture, into a plurality of patches regarded as facets. Each facet has a local curvature, such that the optical surface composed of said facets is smooth but has spatially varying curvature. For purposes of design, the projection surface is also partitioned into patches regarded as pixels, and the desired irradiance pattern is specified as an image composed of per-pixel intensity values. Each possible pairing of facet and pixel is associated with a subset of the incident light field that propagates through the facet and reaches the pixel. Collectively, the determined geometry of the plurality of facets are configured to combine subsets of an incident light field to form a target irradiance pattern on a specified projection surface. Specifically, the local curvatures of the plurality of facets are adjusted to form an irradiance pattern on the projection surface that matches a desired irradiance pattern provided by a user. In most instances, any two nearby facets chosen from the plurality of facets will illuminate overlapping regions on the projection surface, due to the étendue of the light field. This provides an advantage over prior art in which it is assumed that no two facets of the plurality of facets can illuminate overlapping regions on the projection surface, because that assumption is satisfied only in very inefficient optical paths where the light source is extremely small or very far away from the freeform optic. Contemplated is at least one embodiment having the plurality of facets on the transparent or reflective surface, i.e. optical surface, arranged as a substantially continuous surface created by machining or molding an optical materiel, i.e., optical plastics, glasses, or metals.

Some embodiments of the present disclosure provide techniques for designing and manufacturing an optical surface that produces a geometry of the plurality of facets, configured to convert an incident light field to form a target irradiance pattern, such that each facet is associated with a corresponding subset of the incident light field and a corresponding region on the specified projection surface. Wherein this allows the optical surface to be designed and manufactured to cast a custom image, i.e. target irradiance pattern, on a specified projection surface, when lit by an incident light field.

FIG. 1A is a schematic diagram showing a light field represented as a radiant surface (11) that emits different amounts of light in different directions from different points (1). A subset (3AA) of the rays in that light field passes through a facet (5AA) of the freeform surface (13AA). This subset of rays is bent and concentrated or dilated by the freeform surface, then continues to propagate (7AA) to the projection surface (15) where it irradiates an area (9AA). The present disclosure adjusts the shape of the freeform surface (13AA) so that the total irradiance on the projection surface, summed over all ray subsets and facets, best reproduces the distribution of intensities associated with the pixel values of the desired irradiance image (17AA), here shown schematically superimposed on the projection surface.

According to some embodiments of the present disclosure, at least one key insight or realization, among many, is that, one can obtain a correction to the optical surface by solving a linear deconvolution problem in the curvature domain instead of attempting to solve a non-stationary deblurring problem in the energy domain, and the well-understood ray-tracing process produces enough information to make the curvature deconvolution problem well-posed. The main difficulty is that if a freeform optic projects an irradiance image that deviates from the desired irradiance image, defects in the projected image are due to a complicated mix of the étendue of the light field and incorrect geometry of the optical surface, and it was not known how to isolate the effect of incorrect geometry and correct it. In particular, any region on the projection surface can be illuminated through many facets on the freeform surface, consequently, if said region receives too much or too little light, it was unknown how to determine which facets are at fault, in what proportion, and how to correct them. In prior art, there have been attempts to approximately separate the effects of optical surface geometry from the effects of a single extended light source's étendue by treating their admixture as a deblurring problem, with limited success that depended on the light source being relatively small, simple in shape, and far from the freeform optic. In the present disclosure, provides for determining defects in the projected irradiance image are related to flaws in the local curvatures of the optical surface through a system of linear equations; solution of this system of equations is a well-posed deconvolution in the space of curvatures. The solution yields an accurate correction that works for complicated light sources with significant étendue that are large and close to the freeform optic. This is advantageous because it enables the design of highly efficient and compact freeform illumination systems, with unprecedented control over the projected irradiance pattern.

Figure 1B:
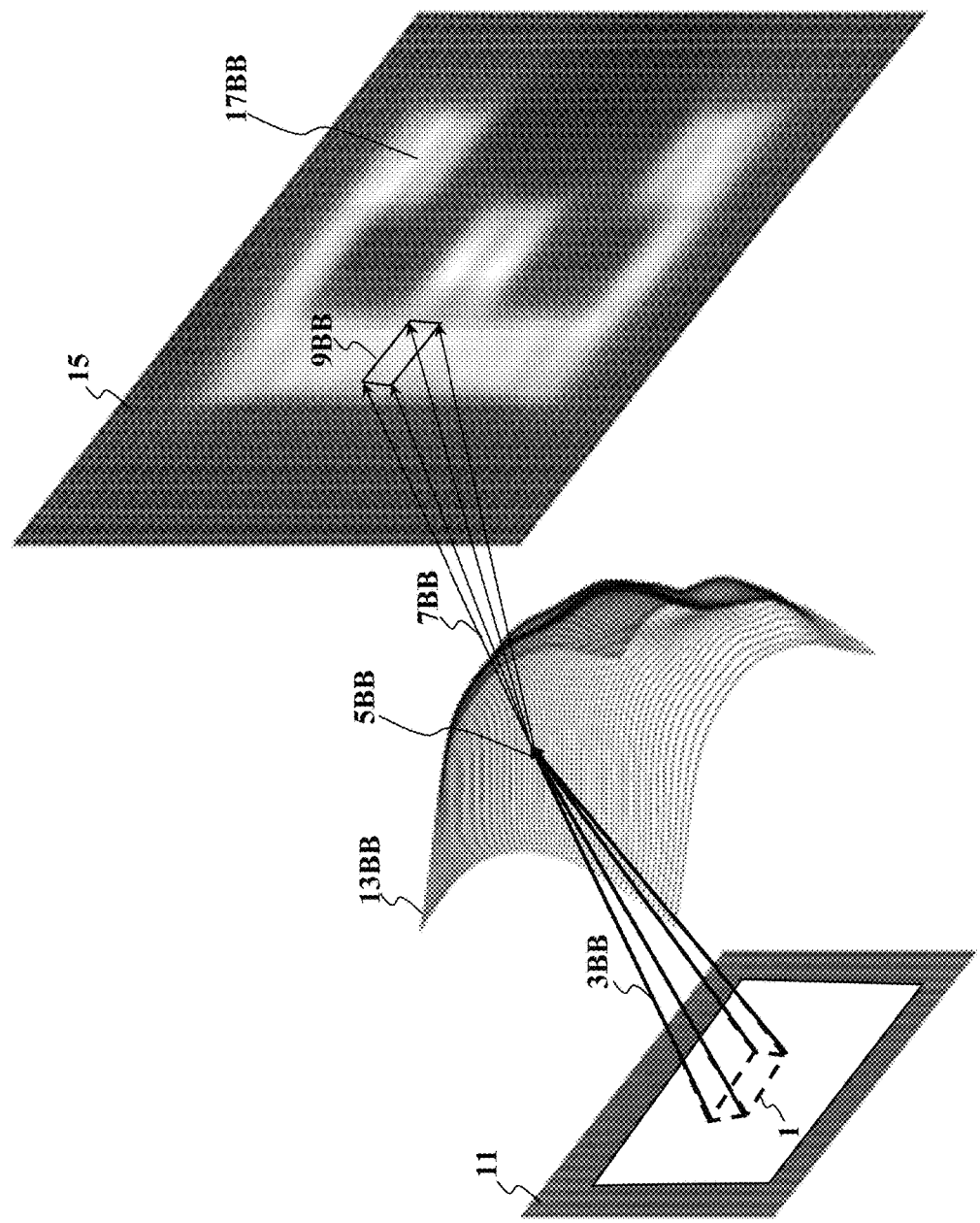
FIG. 1B is a schematic diagram illustrating a large double LED (left) illuminating an optical surface (middle) producing an observed irradiance pattern (right), such that the observed irradiance pattern is obtained from a refraction of incident illumination through the optimized geometry of the optical surface, and cast on the specified projection surface, according to embodiments of the present disclosure.

FIG. 1B is a schematic diagram illustrating a radiant surface (11) that simulates a large double-width LED (1) that radiates in all directions, but with varying intensity. A subset of the emitted rays (3BB) refracts through a facet (5BB) of a freeform optical surface (13BB) and continues to propagate (7BB) to a projection surface (15) where it contributes to the total irradiance (17BB) on that surface. The pattern of total irradiance (17BB) approximates the target irradiance image (17AA in FIG. 1A) as closely as physical law allows.

Figure 1C:
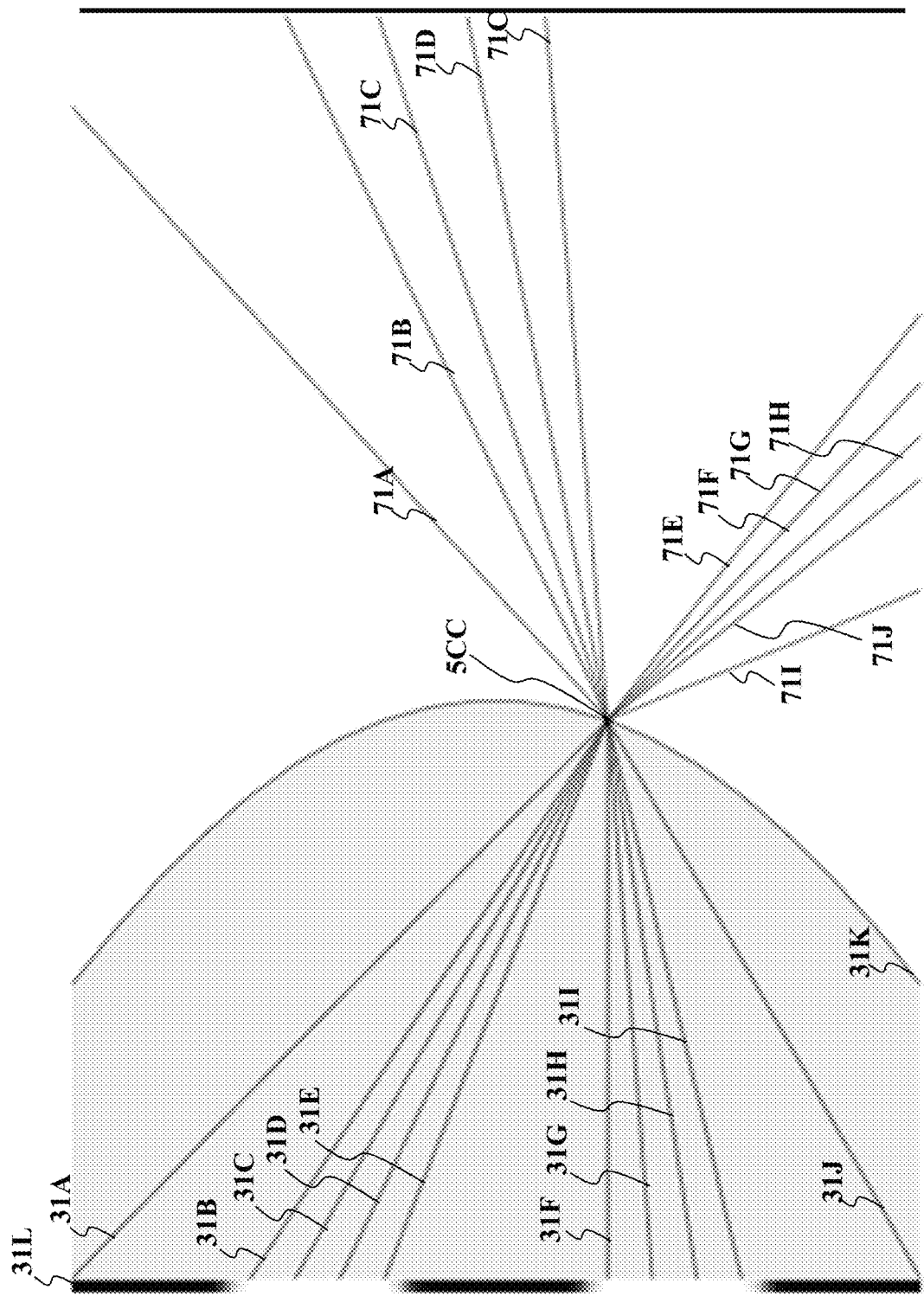
FIG. 1C is a schematic diagram illustrating each point on the optical surface (center) that receives a bundle of rays (from left) and distributes the modified bundle rays to a projection surface (at right), according to embodiments of the present disclosure.

FIG. 1C is a schematic diagram illustrating a point (5CC) on the optical surface (31K) that receives and modifies a bundle of rays (31A-J) from a radiant surface (31L) and distributes the modified bundle of rays (71A-J) to a projection surface (71K), according to embodiments of the present disclosure. In some embodiments, the intensity of each ray (31A-J) depends uniquely on the location and direction it is emitted from the radiant surface (31L) and the modification depends uniquely on the location and slope of the optical surface point (5CC).

Figure 1D:
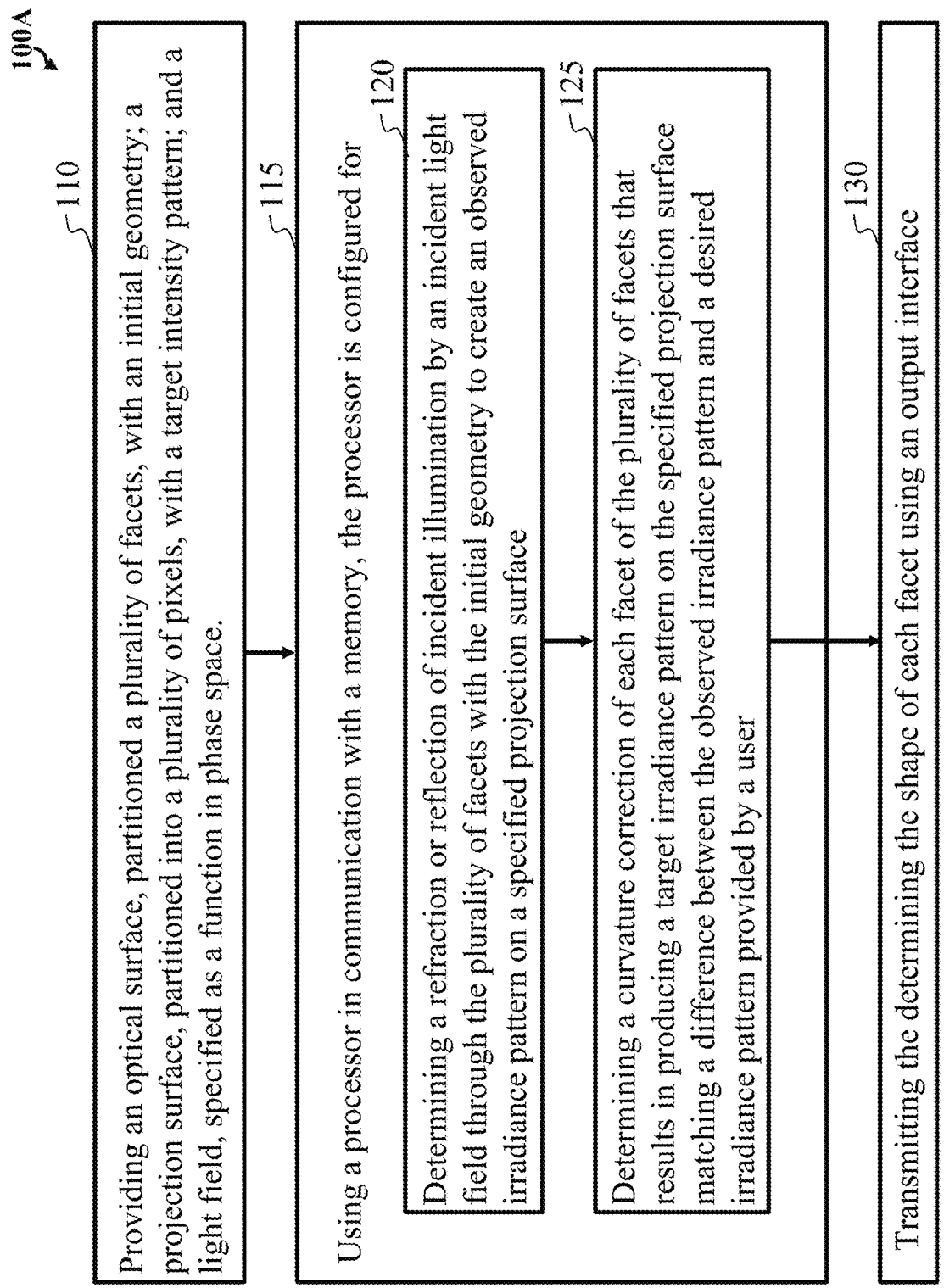
FIG. 1D block diagram of flow steps of a method forming an optic device, according to some embodiments of the present disclosure.

FIG. 1D is a block diagram (100A) of flow steps of a method forming an optic device, according to some embodiments of the present disclosure. The design problem is specified (110) as an initial optical surface, a projection surface, a light field, and a target irradiance pattern on the projection surface. A sequence (115) of corrections is made to the optical surface, first by simulating the irradiance pattern (120) delivered to the projection surface from the light field by the optical surface, then determining a set of corrections (125) to the local curvatures of the optical surface that reduce unwanted differences between the simulated and desired irradiance patterns. These two steps are repeated until the simulated irradiance pattern is satisfactory or no further improvements are possible, at which point the corrected shape of the optical surface is transmitted (130) to a machine that fabricates an optic with the same geometry (e.g., an optical lathe or 3D printer) or reproduces its optical effect diffractively (e.g., a diffractive optical element or spatial light modulator).

Figure 1E:
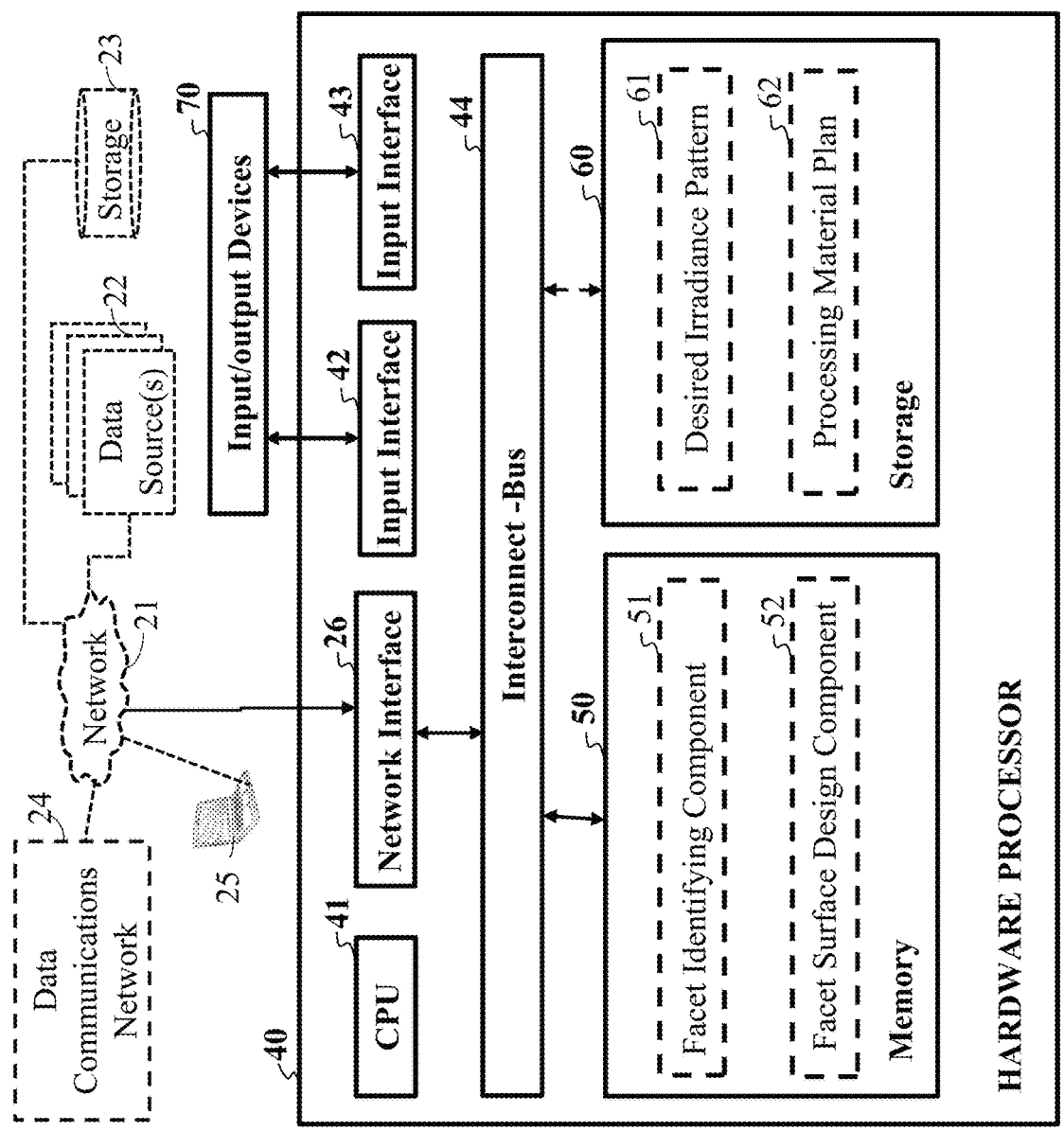
FIG. 1E is a schematic illustrating a computing apparatus that can be used to implement some techniques of the methods and systems, according to embodiments of the present disclosure.

FIG. 1E is a schematic illustrating a computing apparatus that can be used to implement some techniques of the methods and systems, according to embodiments of the present disclosure. For example, the computing system 40 can be configured to develop an optical surface having a plurality of facets, wherein a geometry of the plurality of facets are configured to convert patches of an incident light field to form a target irradiance pattern focused along surfaces of the plurality of facets, cast on pixels of a specified projection surface. Wherein each facet is associated with a corresponding patch of the incident light field and a corresponding pixel of the specified projection surface. Specifically, each facet geometry is configured to form the target irradiance pattern that matches a difference between an observed irradiance pattern and a desired irradiance pattern provided by a user. The computing system 40 can include, by-non-limiting example, a central processing unit (CPU) 41, a network interface 26, an interconnect 44, a memory 50, and storage 60. The computing system 40 may also include input/output devices 70, such that connecting the input/output devices may include a keyboard, a display and mouse devices, etc., by non-limiting example) to the computing system 40.

The CPU 41 can retrieve and execute programming instructions stored in the memory 50. Similarly, the CPU 41 can store and retrieve application data located in the memory 50. The interconnect 44 can facilitate transmission, such as of programming instructions and application data, between the CPU 40, I input/output devices 70, storage 60, network interface 26, and memory 50. CPU 41 is being a single CPU (with one or more processors) or include multiple CPUs (with one or more processors). The memory 50 can include a Facet Surface Design Component 52. The storage 60 can include a desired irradiance Pattern 61 and Processing Material plan or milling plan 62. For example, the Facet Identifying Component 51 can be a data structure that records the shape of the optical surface, then in the algorithm, can provide a grid of elevation values, like in a topo map.

In some embodiments, the Facet Identifying Component 51 can provide a software component configured to identify each facet of the plurality of facets of the optical surface, and provide its local elevation, slope, and curvature. The Facet Surface Design Component 52 uses an algorithm to derive each facet surface for plurality of facets of the optical surface. Once the facet surfaces have been determined, the Facet Surface Design Component 52 may be configured to generate a fabrication plan that can be stored in the storage 60, which can be used to physically realize/process each facet surface so that the entire optic will produce the target irradiance pattern on the specified projection surface when illuminated by the specified light field.

The computer system 40 can include a network 21 connected to a data communications network 24, user computer 25, data sources 22 and exterior data storage 23, wherein the network 21 is connected to the network interface 26.

Figure 2A:
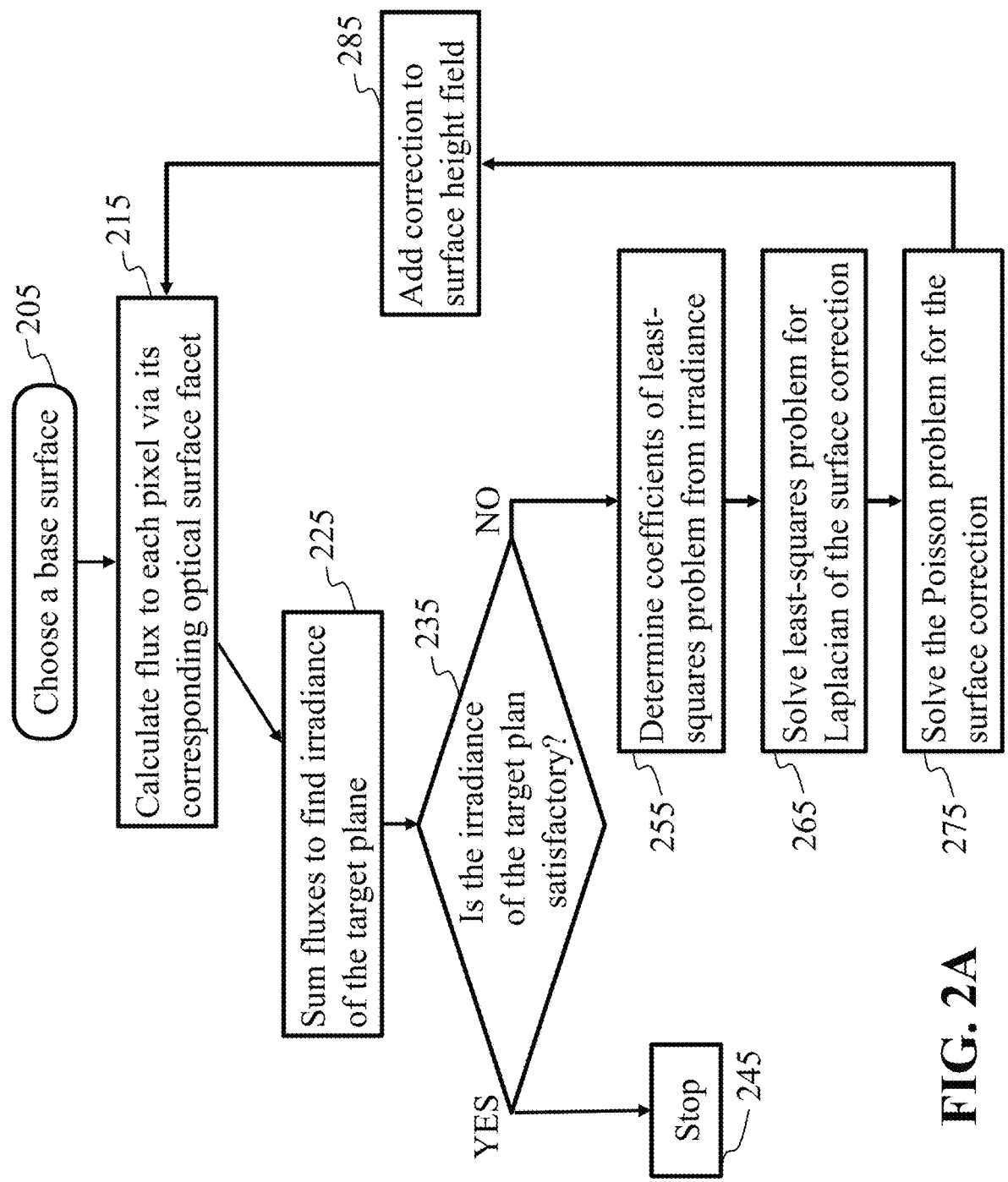
FIG. 2A is a flow diagram illustrating the tailoring process for the general case positive-étendue case, according to embodiments of the present disclosure.

FIG. 2A is a flow diagram for the tailoring process according to embodiments of the present disclosure. The process begins with an initial surface 205 that is chosen by the user. Light propagation is simulated 215 as follows: For each facet on the optical surface and pixel on the projection surface, the computer calculates the total flux from the light field that propagates through the facet and reaches the pixel. Wherein this flux is the cumulative light energy associated with all rays from the light field that are incident both on the facet and on the pixel. Flux calculations may be done via exact integration of equation 9 (see FIGS. 3A-3F in the section titled "With light fields, including extended light sources", below), or via well-understood approximations such the camera equation of geometric optics, Monte Carlo simulation in a ray-tracer, or the ray-casting method of computer graphics. The irradiance pattern 17BB provided by the optical surface is determined 225 by summing all fluxes incident on a pixel from all facets to obtain a total irradiant intensity for that pixel as per equation 9 or equation 10 (see FIGS. 3A-3F in the section titled "With light fields, including extended light sources", below); this is repeated for each pixel. The simulated irradiance pattern is subtracted from 235, the desired irradiance pattern, and if, the resulting irradiance error is within a satisfactory range, i.e. YES, then the process terminates 245. Otherwise, i.e. NO, a system of linear equations is constructed 255 in which the fluxes are scaled as per equation 11 (see FIGS. 3A-3F in the section titled "With light fields, including extended light sources", below), and arranged in a matrix as per equation 12 (see FIGS. 3A-3F in the section titled "With light fields, including extended light sources", below), with each row containing fluxes incident on a specific pixel and each column containing fluxes incident on a specific facet; the irradiance error is similarly arranged in a vector. This system of linear equations relates pixel irradiance errors on the projection surface to facet curvature errors on the optical surface. The system of equations is solved 265 in a minimum squared error sense using standard numerical methods, yielding a vector of curvature correction values, one of each facet. These values are arranged in a matrix to form a two-dimensional Poisson problem, which is solved 275 using standard numerical methods, yielding an array of height corrections for the optical surface. The corrections are added 285 to the height values that specify the optical surface shape, and the entire process repeats with a new flux simulation 215.

Figure 2B:
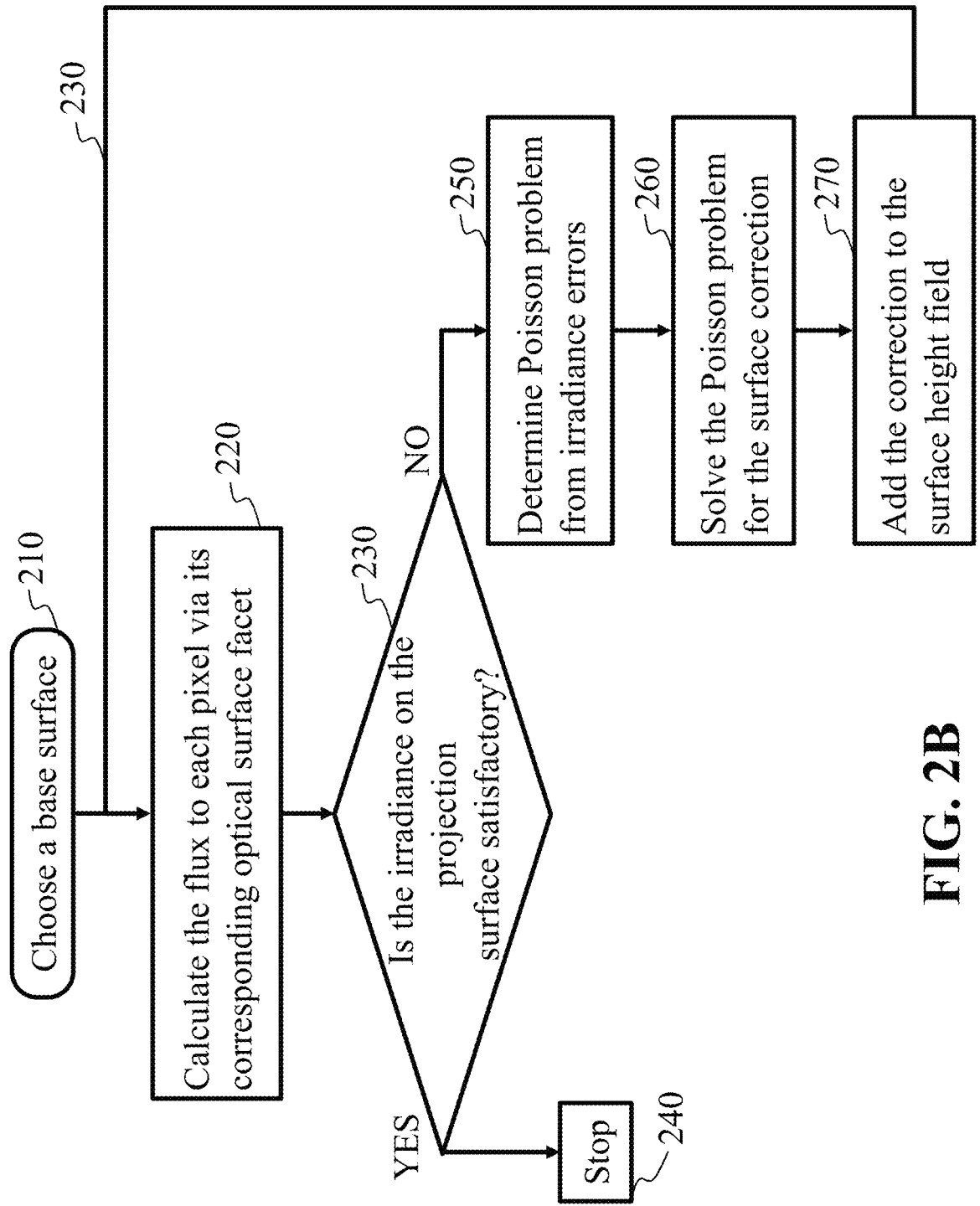
FIG. 2B is a flow diagram illustrating the tailoring process, reduced to a zero-étendue case, according to embodiments of the present disclosure.

FIG. 2B is a flow diagram illustrating an algorithm for implementing the method of FIG. 2A for optical systems that have near-zero étendue, according to embodiments of the present disclosure. The process begins with an initial surface 210 that is chosen by the user. Light propagation is simulated 220 as follows: A ray from the light source is propagated through each facet, where its intensity is diluted or concentrated by the curvature of the facet, and then on to the projection surface. The simulated irradiance pattern is subtracted 230 from the desired irradiance pattern, and if, the resulting irradiance error is within a satisfactory range, i.e. YES, then the process terminates 240. Otherwise a Poisson problem is constructed 250 by scaling the irradiance errors as per equation 8 (see section titled "Via Poisson corrections", below). The Poisson problem is solved 260 using standard numerical methods, yielding an array of height corrections for the optical surface. The corrections are added 270 to the height values that specify the optical surface shape, and the entire process repeats with a new flux simulation 220.

Figure 2C:
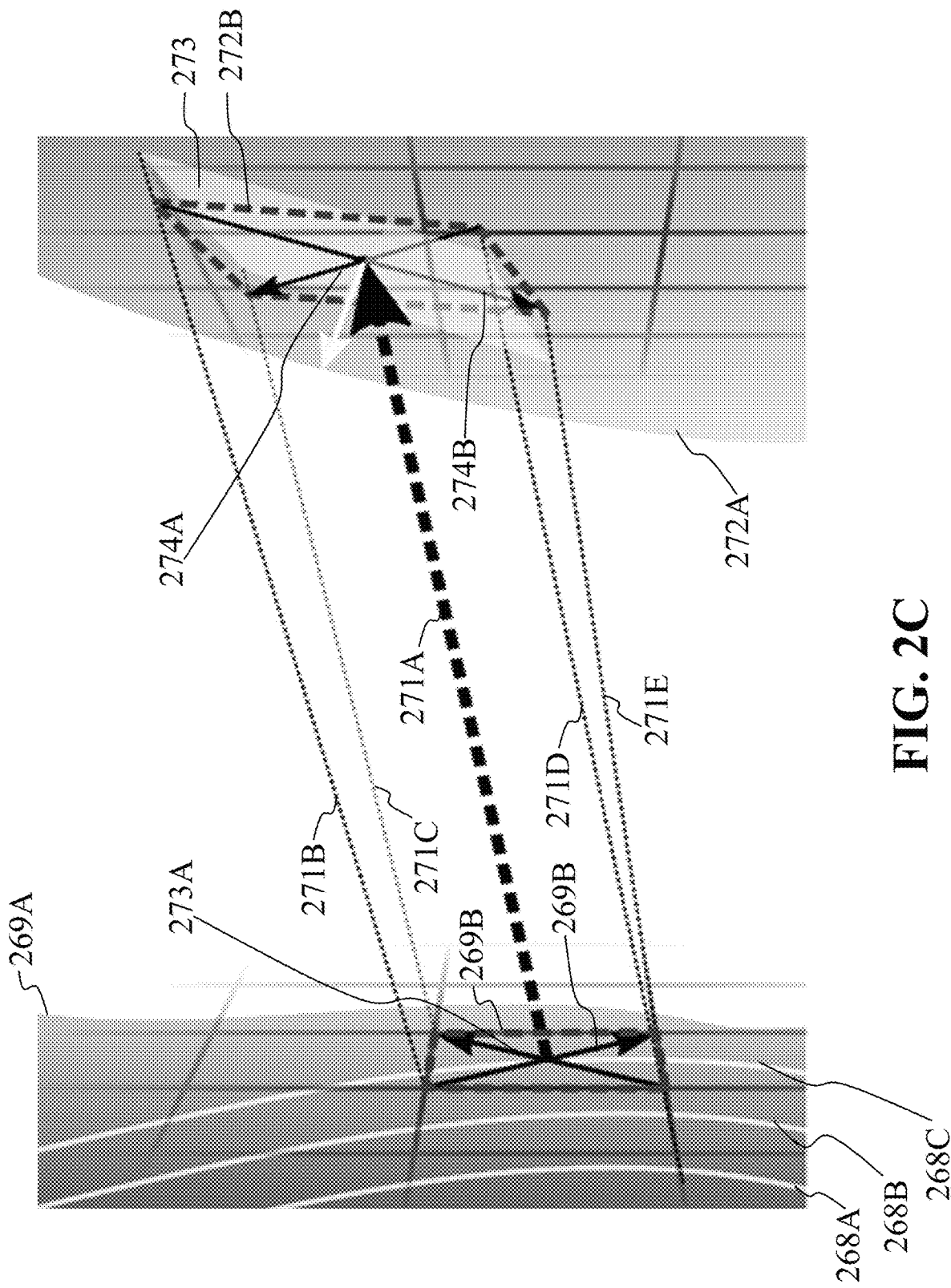
FIG. 2C illustrates aspects of examples of the methods of FIG. 2A and FIG. 2B, according to some embodiments of the present disclosure.

FIG. 2C illustrates aspects of examples of the algorithm (model) for implementing methods of FIG. 2A and FIG. 2B, according to some embodiments of the present disclosure. Initially, FIG. 2C relates surface curvature to dilations, where a wavefront w (white isocontours 268A, 268B, 268C) of local average intensity s bends through a surface area element dA (grid square 269A) on surface z 269A, and the ray bundle dilates (dotted lines 271A, 271B, 271C, 271D, 271E) to irradiate a (white) quadrilateral dB 273 on the projection surface 272A with average intensity u. The dilation, obtained by comparing the diagonals (solid black arrows 273A & 273B, 274A & 274B) of two parallel cuts through the ray bundle (dashed quadrilaterals 269B, 272B), relates the flux density dilution s/u to the Laplacians of the surface z and wavefront w via eq. (4).

Givens of Model

Still regarding FIG. 2C, most quantities are interchangeably treated as points, fields, or functions, e.g., n can represent a scalar refractive index, a gradient index field, or a differentiable function n(x, y, z). All varieties are tabulated in Table 1.

TABLE 1

| Symbol | Meaning |
| --- | --- |
| c | Optical surface correction |
| dA | Lens element |
| dB | Projection plane element, (G = 0) |
| $dB_p$ | Radiant area element, (G > 0) |
| dT | Projection plane element, (G > 0) |
| G | Étendue |
| I, $I_p$ | Target irradiance |
| $\hat{I}_o$ | Actual irradiance at p, (G > 0) |
| e, $e_p$ | Radiance |
| n | Refractive index ratio |
| o, $o_p$ | Obliquity |
| p | Test point location |
| r, $r_p$ | z-component of displacement |
| s | Incident intensity at z |
| $s^-$ | Flux density at z |
| u | Target unwarped irradiance |
| $u^-$ | Actual unwarped irradiance |
| W | Wavefront function |
| w | Local wavefront isosurface |
| z | Optical surface height field |
| $\theta_A$, $\theta_{A,p}$ | Angle of incidence at z |
| $\theta_B$ | Angle of incidence at dB |
| $\theta_{B,p}$ | Angle of exitance at $dB_p$ |
| $\theta_Q$ | Ray angle to the z-axis |

Given a base surface described as a height field $z:(x,y) \mapsto \mathbb{R}$ and a target irradiance unwarp function $u:(x,y) \mapsto \mathbb{R}_+ \cup 0$ which simulates ray transport and then samples the intensity from the desired irradiance field at the point where a ray from optical surface point (x, y, z (x, y)) would meet the projection surface. This is known as the pullback of the irradiance to the coordinate system of the optical surface. For each ray the simulator also provides a z-axis-parallel propagation distance $r:(x,y) \mapsto \mathbb{R}_+$ from the optical surface to the projection surface and an obliquity angle $\theta_B:(x,y) \mapsto \mathbb{R} \cap (-\pi/2, \pi/2)$ between the ray and the projection surface normal at the ray terminus. On the radiant side, some embodiments assume a wavefront function $W:(x,y) \mapsto \mathbb{R}_+$ which provides the direction $\nabla W:(x,y,z) \mapsto \mathbb{R}^3$ and divergence $\nabla^2 W:(x,y,z) \mapsto \mathbb{R}$ of the incident rays at any surface point (x, y, z (x, y)). For notational convenience, $w:(x,y) \mapsto \mathbb{R}$ can be defined as the isosurface of W in the neighborhood of (x, y, z (x, y)). Finally, an incident flux density $\dot{s}:(x,y) \mapsto \mathbb{R}_+$ can be assumed at any optical surface point (x, y, z (x, y)), or equivalently, a surface irradiant intensity $s = s^- \cos \theta_A$ where $\theta_A:(x,y) \mapsto \mathbb{R} \cap (-\pi/2, \pi/2)$ is the angle of the incident ray with the z-axis. The incident wavefront w plays a role in derivations but is cancelled out in the solutions, so it need not be mathematically characterized for the reduction to practice.

Transport from Surface Gradients

Still regarding FIG. 2C, a simple geometric fact governing ray propagation at an interface between two homogeneous media: The interface normal n satisfies $$n \propto n \frac{r_i}{\|r_i\|} - \frac{r_e}{\|r_e\|}, \quad \text{(Eq. 1)}$$

where $r_i \in \mathbb{R}^3$ is the incident ray, $r_e \in \mathbb{R}^3$ is the extent ray, $n \doteq n_i/n_e$ is the ratio of refractive indices on either side of the interface (n=−1 for mirrors), and $\|\cdot\|$ is the Euclidean norm.

In the model, the surface normal is $n = (-\nabla z, 1) = (-\partial_x z, -\partial_y z, 1)$, the incident direction is $n = (-\nabla_z, 1) = (-\partial_x z, -\partial_y z, 1)$, the incident direction is $r_i = \nabla W \propto \text{sign}(n)(-\nabla w, 1)$, and an exit ray rooted at interface point (x, y, z) meets the projection surface at ray terminus $(x,y,x) + r r_e$. Solving eq. (1) for the existent direction $r_e$ and dropping the higher order terms, providing $$r_e \approx n r_i + (1-n)n = ((n-1)\nabla z - n\nabla w, 1) \quad \text{(Eq. 2)}$$

Dilations from Surface Laplacians

Specifically, the bundle of rays that travel from area element dA on the optical surface to area element dB on the projection surface (FIG. 2C) is the interest. Conservation of energy requires identical flux totals through the two area elements: $\int s \, dA = \int u \, dB$. In any area small enough that s and u are essentially constant, there is $s \, dA = u \, dB$, and therefore, to achieve a desired intensity dilution s u, we seek to control the local geometric dilation dB/dA. This can be reduced to plane geometry in a local Cartesian coordinate frame, where $dA \doteq dx \, dy$ is a square area element with average incident intensity s and dB is a quadrilateral area with average irradiant intensity u: The area of quadrilateral dB is half the cross product of its vector diagonals, $\frac{1}{2}(d_1 \times d_2)$. These vectors are the change in the ray terminus as the ray root moves across the two diagonals of dA: specifically $d_1, d_2 \approx dx (e_x + r\partial_x r_e) \mp dy(e_y + r\partial_y r_e)$ where $e_x$ and $e_y$ are the unit vectors in the x- and y-directions. It is more convenient to calculate the area dQ of a quadrilateral formed by taking a constant-z cut through the bundle where it meets the projection surface, in which case the diagonals simplify to 2D vectors $d_1, d_2 \approx dx (e_1 + r\partial_x \nabla_q) \mp dy(e_2 + r\partial_y \nabla_q)$, with $q = ((n-1)z - nw)$ from eq. (2). For small dA, the two quadrilateral areas are related by $dQ \cos \theta_Q = dB \cos \theta_B$ where $\theta_B$ (resp. $\theta_Q$) is the angle between the local normal of the projection surface (resp. constant-z plane) and the central ray $r_e$ of the bundle. Putting this all together yields $$dB \cos \theta_B = (1 + r\nabla^2 q + r^2((\partial_{xx} q)(\partial_{yy} q) - (\partial_{xx} q)^2)) \cos \theta_Q \, dA). \quad \text{(Eq. 3)}$$

If by assuming that the surface exhibits little curvature inside dA, then the coefficients to $r^2$ in eq. (3) are negligible and the area dilation can be obtained $$\frac{dB}{dA} = (1 + r\nabla^2((n-1)^2 z - nw))/o, \quad \text{(Eq. 4)}$$

where corrections for non-orthogonal projections are absorbed into the obliquity term $o \approx \cos\theta_B/\cos\theta_Q$.

Alternately, if by assuming that the quadrilateral dQ is approximately square, such that $\partial_{xx}q \approx \partial_{yy}q$ and $\partial_{xy}q \approx 0$, dB $\cos\theta_B = (1 + r\nabla^2 q + r^2(\nabla^2 q)^2/4)\cos\theta_Q$ dA, yielding $$\frac{dB}{dA} = \left(1 + \frac{r}{2}\nabla^2((n-1)z - nw)\right)^2/o. \quad \text{(Eq. 5)}$$

Tailoring
As a Poisson Problem

Combining dilation (4) or (5) with a pointwise conservation constraint s/u=dB/dA and isolating z reveals the Poisson problem $$\nabla^2 z = \frac{1}{n-1}\left(\frac{m}{r} + n\nabla^2 w\right), \quad \text{(Eq. 6)}$$

where in is the mismatch between the light incident on the optic from the source and the light pulled back to the optic from the target: in $=\bar{s}-o/u-1$ for eq. (4) or $m = 2(\sqrt{\bar{s}o/u}-1)$ for eq. (5). Here the obliquity term is $o \doteq \cos\theta_A \cos\theta_B \sec\theta_Q$. Treating eq. (6) as a fixpoint yields a simple tailoring algorithm: Use a provisional surface estimate z to calculate (via simulated transport) the ray-dependent r.h.s. terms (unwarped target irradiance samples u, propagation depths r, obliquities o); solve the Poisson problem via FFT to update z; repeat until convergence. The fixpoint works well for substantially linear problems where ray bends are modest. In the very linear case of uniform collimated light ($\bar{s} = o = 1$, $\nabla^2 w = 0$), a long focal length ($r \gg 0$), and a nearly flat optical surface ($z \approx 0$), eq. (6) contains as special cases freeform methods that view the irradiance as the Laplacian of z [6, 11].

Via Poisson Corrections

A more effective fix point is obtained by comparing the desired irradiance u with the irradiance $\hat{u} = s$ dA dB actually produced by a provisional surface z. We will seek a field c of corrections to surface z that satisfies the linear dilations model, $$u = s\frac{dA}{dB_c} = \frac{\bar{s}o}{1 + r\nabla^2((n-1)(c+z) - nw)}, \quad \text{(Eq. 7)}$$

in which $dB_c$ is simply dB in eq. (4) with c added to z. Then, eq. (7) can be written for u and $\hat{u}$ (with and without c), difference them, and solve for the Laplacian of c to obtain a Poisson correction $$\nabla^2 c = \frac{\bar{s}o}{(n-1)r}\left(\frac{1}{u} - \frac{1}{\hat{u}}\right) = \frac{1}{u}\frac{(\hat{u} - u)}{(n-1)}\frac{\overline{dB}}{dA}, \quad \text{(Eq. 8)}$$

where $\overline{dB}/dA$ is the dilation dB/dA in eq. (4) without the obliquity terms. Note that once u and $\hat{u}$ are identified, via simulation, then the incident intensities (first form) or dilations (second form) need to be computed for the correction. Algorithmically, we proceed as above but update $z \leftarrow z+c$. In regard to numerical considerations, see section below titled "Numerical considerations".

The correction method has some advantages: Most of the nonlinearities of the optical path are captured on the r.h.s. of eq. (8) and can be calculated exactly in the simulation of transport, while the linearization's noted above, are at play only in the relatively small curvature corrections, where they are accurate. Referring to the mirror of FIG. 3C and the mirror of FIG. 3F, the two mirrors estimated via eq. (8) produce the same irradiance, but from different base surfaces, as per schematic ray transport diagrams. Grayscale shading (335 and 375) on the depicted mirror surfaces (330 and 370) indicates local surface curvature. Further, this yields superior results when steep slopes, high curvatures, short focal lengths, Fresnel losses, or high contrast ratios are present. Additionally, the tailored optic can inherit some useful properties from a suitably designed base surface, e.g., demagnifying to increase brightness, or crossing all rays to force surface convexity, as in r.h.s. (see FIGS. 3A, 3B, 3C, 3D, 3E and 3F).

FIGS. 3A, 3B, 3C, 3D, 3E and 3F illustrate two mirrors that produce photographic projections, demonstrating the ability to implement transforms, the mirror at right reflects at a 45 degrees angle and forces all rays to cross so that the beam fits through a small aperture, the greyscale texture on the black mirror surfaces indicates local curvature, according to embodiments of the present disclosure.

Figure 3A:
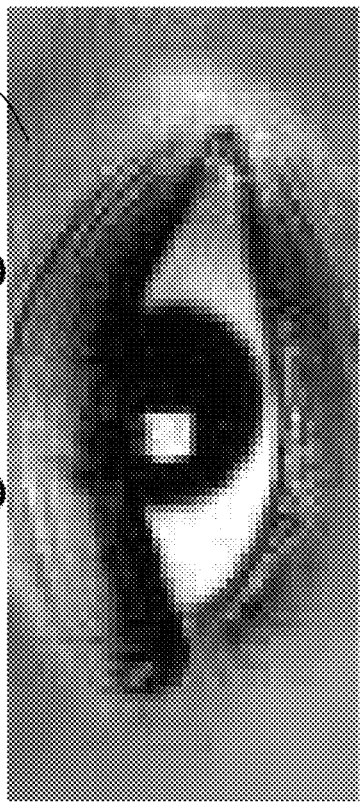
Figure 3B:
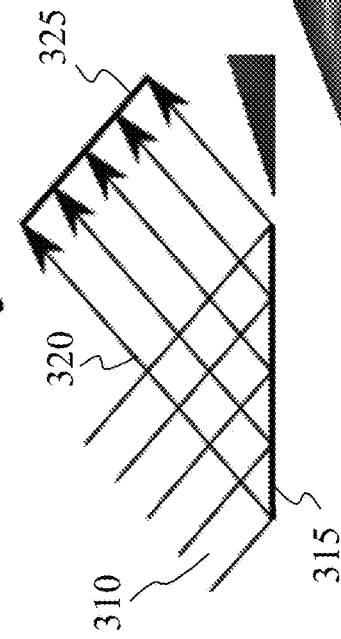
Figure 3C:
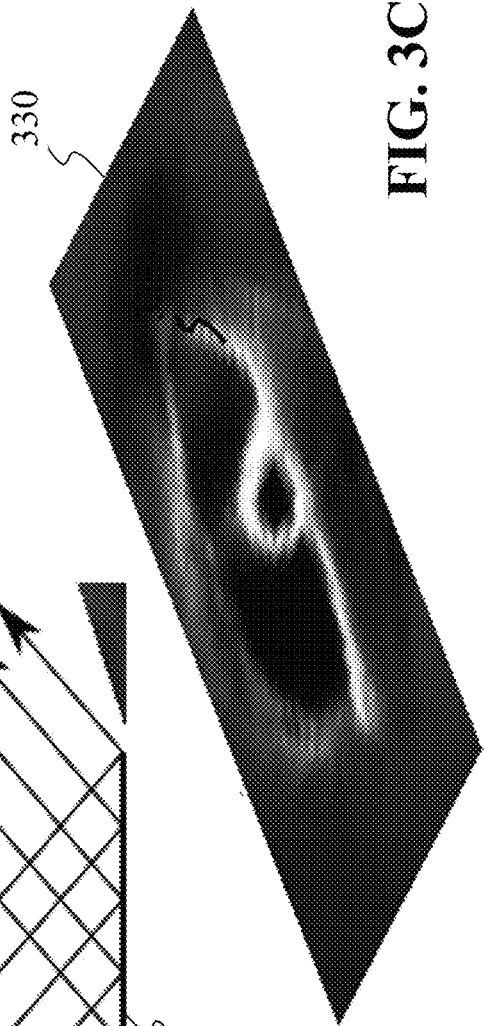

FIG. 3A illustrates the desired irradiance pattern 305 that will be reproduced by the mirrors in FIG. 3C and FIG. 3F mirrors. The pattern is specified as an image 305 whose pixel intensities will be reproduced as irradiance intensities on the projection surfaces.

FIG. 3B illustrates the optical path in the first example. Collimated light rays 310 are incident on a mirror 315 and their reflection 320 is incident on a planar projection surface 325.

FIG. 3C illustrates the tailored mirror shape 330 obtained by the application of the method summarized in FIG. 2B. The mirror 330 is nearly flat, except for some regions of high curvature 335 that divert rays away from the regions of the projection plane where the desired irradiance pattern should be dark, namely the pupil, iris, and eyelashes in the target image 305.

FIG. 3D is the irradiance pattern 340 obtained on the projection surface 325 by simulating the action of the tailored mirror 330 in FIG. 3C in the optical path of FIG. 3B.

FIG. 3E illustrates the optical path in the second example. Diverging light rays 345 from a common radiant point 350 are incident on a concave mirror 355 and their reflection 360 is incident on a planar projection surface 365. Due to the concavity of the mirror, the reflected rays 360 all cross before reaching the projection surface 365.

FIG. 3F illustrates the tailored mirror shape 370 obtained by the application of the method summarized in FIG. 2B to an initially concave mirror 355. The mirror 370 remains concave after tailoring, with some regions of higher curvature 375 that divert rays away from the regions of the projection plane where the desired irradiance pattern should be dark, namely the pupil, iris, and eyelashes in the target image 305. The resulting irradiance pattern on the projection surface 365 is identical to the irradiance result 340 depicted in FIG. 3D.

With Light Fields, Including Extended Light Sources

Regarding FIGS. 3A, 3B, 3C, 3D, 3E and 3F, thus far assumed is that the wavefront W associates a single ray vector ∇W to every point in space. While more general than a collimated or point light source, this falls far short of nature's full plenoptic function. For the purposes of tailoring, the plenoptic function can be summarized as a light field of directional flux densities $\bar{s}(\mu,v,\phi,\theta)$ sampled at a (possibly fictive) radiant surface, i.e., $s^-$ gives the flux passing through the surface point $\mu$, $v$ in the global direction $\phi$, $\theta$. This contains multiple/extended/asymmetric light sources as special cases. In such cases, the law of étendue almost always excludes the possibility of an exact tailoring solution, but good approximations have practical utility.

To extend the correction method to incident light fields, both the radiant and irradiant surfaces are considered, but reverse their roles. It is useful to imagine a camera that views the optical surface through an infinitesimal aperture dT located at a point $p \in \mathbb{R}^3$ on the projection surface. The camera sees a distorted image of the light source(s) on a subset $\Omega$ of the optical surface. Ideally, the total observed flux matches $I_p dT$, where $I_p$ is the desired irradiant intensity at p. In other words, we want $I_p dT = \int s_p dA$ for the flux field $s_p$ that the camera at p observes on the optical surface. To calculate this quantity from the dilation eq. (4) by reversing the roles of the radiant and irradiant surfaces: We imagine projection surface point p emitting a spherical wavefront $w_p$ back through the optical surface z, and calculate a field of dilations $$\frac{dA}{dT}\frac{dB_p}{dA}$$

of this wavefront as it propagates backward from the projection surface to the optical surface z and then to the radiant surface, where we sample a 2D field $\ell_p : (x,y) \mapsto \mathbb{R} \cup 0$ of p-destined radiance values from the 4D light field function $s^-$. This radiance push forward field $\ell_p$ plays an analogous role to the irradiance pullback field u in previous sections and is similarly parameterized by the optical surface's coordinate system. Conservation of energy requires that each step have the same $$I_p dT = \int_\Omega s_p dA = \int_\Omega i_p \left(\frac{\cos\theta_{Q,p}}{r_p}\right)^2 \cos\theta_{B,p} dB_p \cos\theta_{A,p} dA, \quad \text{Eq. 9)}$$

where the integrand on the right-hand side is the standard radiometric calculation of flux from an infinitesimal source $dB_p$ through an aperture dA.

We adapt eq. (7) to find $dB_p$ by noting in the extended source case, where we are tracing the light backward, the relationship between the facet size dA in eq. (7) and the pixel size dT is arbitrary. We choose dA=dT and substitute eq. (7) into eq. (9) to obtain the desired irradiance relation $$\forall_p\, I_p dT = \int_\Omega \ell_p \frac{o_p}{r_p^2}\left(1 - (n^{-1}-1)r_p \nabla^2\left(c + z + \frac{n}{n-1}w_p\right)\right) dt dA, \quad \text{(Eq. 10)}$$

where all projective cosines are absorbed into the obliquity $o_p$:

$$o_p \doteq \cos^3\theta_Q \cos\theta_A$$

which echoes the $\cos^4$ law of the camera equation for Lambertian radiant surfaces (for isotropic emitters, $\ell_p$ will contain a $\cos^{-1}\theta_{B,p}$ term).

Differencing the irradiance at p eq. (10) for the corrected ($c\neq 0$) and uncorrected ($c=0$) surfaces yields the irradiance error $$I_p - \hat{I}_p = \int_\Omega \frac{n-1}{n}\ell_p \frac{o_p}{r_p}\nabla^2 c\, dA\ \forall_p, \quad \text{(Eq. 11)}$$

where $\hat{I}_p$ is the irradiance delivered to p by the uncorrected surface z, i.e., the r.h.s. of eq. (9). Here we have assumed that the correction is small enough that the change to $\ell_p\, o_p/r_p$ is negligible.

R.h.s. eq. (11) establishes that the irradiance error is a convolution of the light field samples $\ell_p$ and the curvatures $\nabla^2 c$ of the correction field. That convolution is nonstationary because the p-subscripted terms are different for each test point. This nonstationarity is the reason why deblurring approaches to extended-source tailoring reaches an impasse. However, in the space of curvatures, the deconvolution is straightforward: We set up a least-squares problem for the Laplacian of the correction, $\nabla^2 c$, by discretizing the lens surface into facets with area dA and choosing test points $p(i,j)$ on the projection surface. For each test point $p(i,j)$, eq. (11) generates one linear equality constraint, in inner product form $$\left\langle vec\left(\frac{n-1}{n}\ell_p \frac{o_p}{r_p}dA\right), vec(\nabla^2 c)\right\rangle = I_p - \hat{I}_p, \quad \text{(Eq. 12)}$$

where the first vectorized field is nonzero wherever the camera at p sees light coming from the optical surface z. Iterating over all test points $p(i,j)$, this forms a large but sparse system of linear equations for the elements of $\nabla^2 c$. To tailor the surface z, we solve the system of linear equalities for $\nabla^2 c$, solve the Poisson problem for the correction c, add c to surface z, and repeat until the corrections become vanishingly small. FIG. 1B illustrates a short-focus lens tailored in this manner.

Observing that local curvatures of an incident wavefront and an optical surface are linearly related to beam dilations, we formulated freeform irradiance tailoring as a Poisson problem. Algebraically eliminating the wavefront yielded a sequence of surface corrections based on pullbacks of the irradiance. Reversing the roles of the radiant and irradiant surfaces in this solution makes it possible to generalize to extended sources and more generally to arbitrary incident light fields. This approach easily accommodates varied light transport phenomena; beyond the pedagogical examples in this paper, we have used it to tailor freeforms situated in optical paths with multiple extended light sources, additional optical elements pre- and post-freeform, partial occlusions and internal reflections, and Fresnel losses.

Numerical Considerations

All operations are O N time for N grid elements, except for the least-squares problem, whose complexity depends on its sparsity, and the Poisson problem $\nabla^2 c = f$, which can be solved in O(N log N) time via the discrete FFT. On a rectangular domain, this takes a particularly simple form $$K(c) = \mathcal{F}^{-1}(\mathcal{F}(K(t))\cdot \mathcal{F}(\mathcal{L})^{-1})$$

here, F(·) and F⁻¹(·) are the 2-dimensional FFT and inverse FFT with periodic boundary conditions; K(f) reflects a field as $$K : f \mapsto \begin{bmatrix} f & \mp \mathtt{J} \\ \mp \mathtt{J} & f \end{bmatrix};$$

$\mathcal{L}$ is the discrete Laplacian operator; $\mathcal{F}(\mathcal{L})^{-1}$ is the pseudo-inverse of the Laplacian in the Fourier domain (an element-wise inverse of $\mathcal{F}(\mathcal{L})$ with a resulting infinity zeroed out); and F⁻¹(·) is the inverse FFT. All field arithmetic is element-wise. The signs in K(·) are optionally positive to fixate the boundary of the projection by forcing Neuman boundary conditions ((dc/dx=0 at the left and right edges; dc/dy=0 at the top and bottom). For disk and spherical domains, mixed Fourier/Chebeyshev methods will solve the Poisson problem in O(N log N) time in polar and spherical coordinates, respectively.

Zeroes and near-zeroes in the target irradiance field can imply infinite dilation and thus infinite curvature. To prevent numerical instabilities, we recommend the substitution $1/u \rightarrow 1/(u+\in_1)$ with small $E_i > 0$ decreasing in each iteration.

Light field tailoring eq. (11) specifies a linear system of the form Ax=b which can have poor numerical condition or be under constrained, particularly if the projection surface is under sampled or if some optical surface element is not on any path from a light source to a projection test point. In such cases, we use a Tikhanov-regularized problem $(A^T A + \in^2 I) = A^T b$ to select for flatter, smoother corrections.

Figures 4A, 4B, 4C:
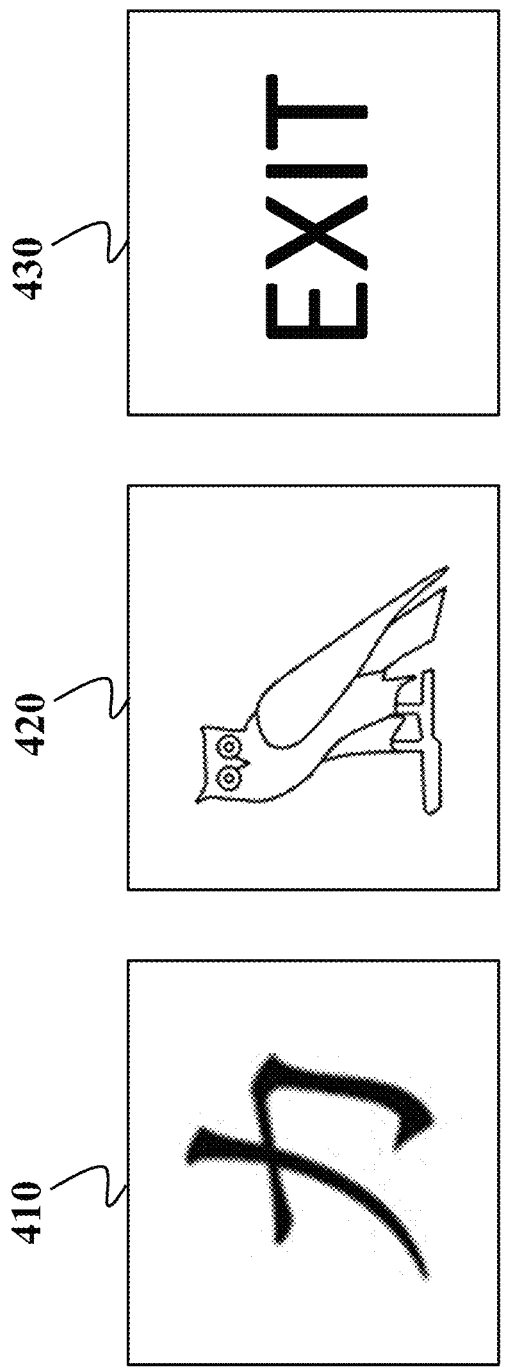
FIG. 4A, FIG. 4B and FIG. 4C are different non-limiting examples of target illumination patterns produced by some embodiments, according to embodiments of the present disclosure.

FIG. 4A, FIG. 4B and FIG. 4C are different non-limiting examples of target illumination patterns produced by some embodiments, according to embodiments of the present disclosure. The illuminated patterns of FIG. 4A-4C are illustrated for clarity purposes using black lines. In practice, those exemplar images can be inversed, wherein some embodiments, can include illumination patterns such as a glyph 410 of FIG. 4A, an artistic image 420 of FIG. 4A, or an illumination pattern with letters forming a word 430 of FIG. 4C. In some embodiments, the illumination pattern(s) can be an asymmetrical pattern. It is possible the illumination pattern(s) can also have brightness gradients. Contemplated is that the illumination pattern can have a combination of any of the above features, i.e. a glyph, an artistic image, an illumination pattern with letters forming a word, an illumination pattern(s) having brightness gradients, an illumination pattern(s) that has an asymmetrical pattern or an illumination pattern(s) having brightness gradients.

Figure 5:
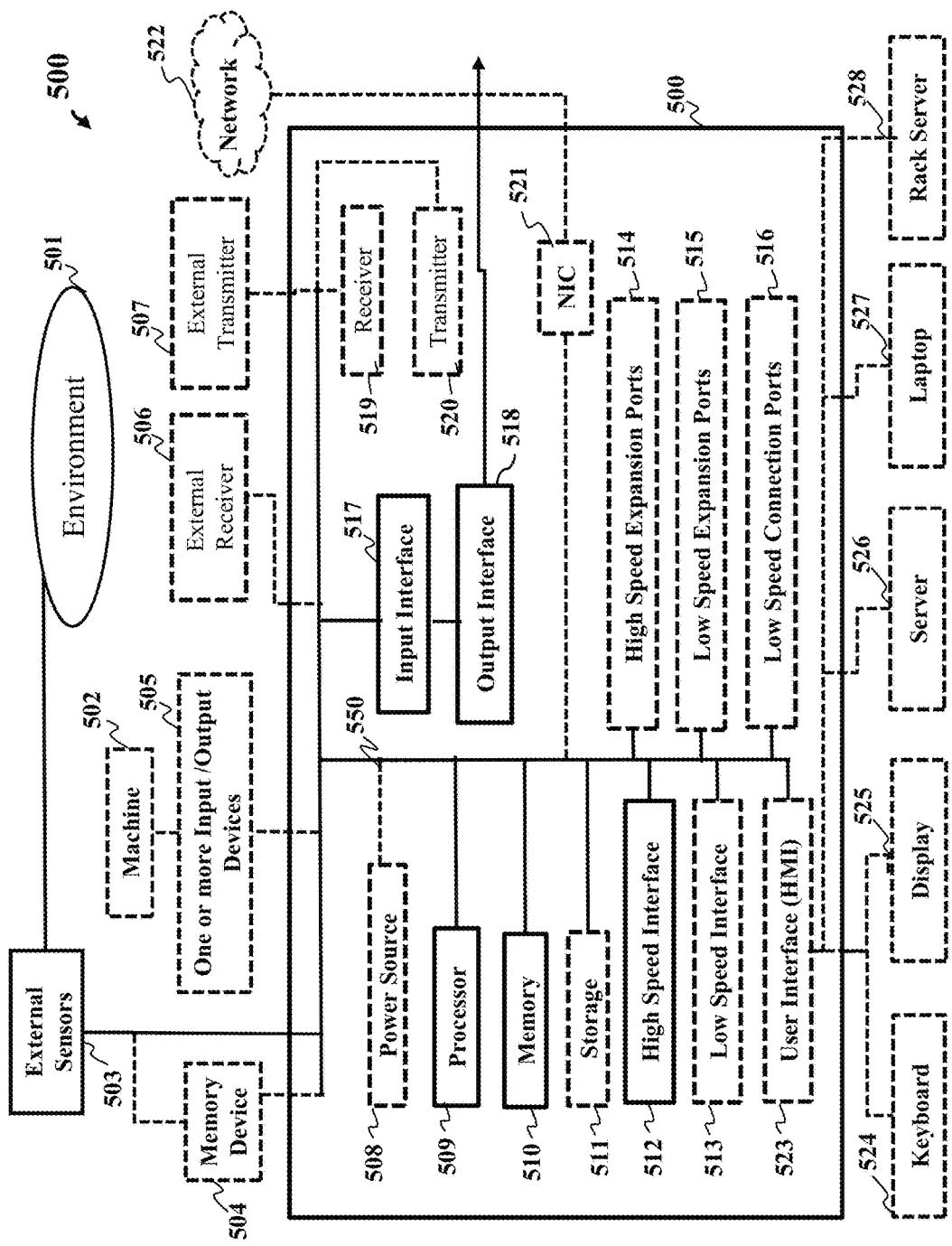
FIG. 5 is a schematic illustrating a computing apparatus that can be used to implement some techniques of the methods and systems, according to embodiments of the present disclosure.

FIG. 5 is a schematic illustrating by non-limiting example a computing apparatus 500 that can be used to implement some techniques of the methods and systems, according to embodiments of the present disclosure. The computing apparatus or device 500 represents various forms of digital computers, such as laptops, desktops, workstations, personal digital assistants, servers, blade servers, mainframes, and other appropriate computers.

The computing device 500 can include a power source 508, a processor 509, a memory 510, a storage device 511, all connected to a bus 550. Further, a high-speed interface 512, a low-speed interface 513, high-speed expansion ports 514 and low speed connection ports 515, can be connected to the bus 550. Also, a low-speed expansion port 516 is in connection with the bus 550. Contemplated are various component configurations that may be mounted on a common motherboard, by non-limiting example, 530, depending upon the specific application. Further still, an input interface 517 can be connected via bus 550 to an external receiver 506 and an output interface 518. A receiver 519 can be connected to an external transmitter 507 and a transmitter 520 via the bus 550. Also connected to the bus 550 can be an external memory 504, external sensors 503, machine(s) 502 and an environment 501. Further, one or more external input/output devices 505 can be connected to the bus 550. A network interface controller (NIC) 521 can be adapted to connect through the bus 550 to a network 522, wherein data or other data, among other things, can be rendered on a third party display device, third party imaging device, and/or third party printing device outside of the computer device 500.

Contemplated is that the memory 510 can store instructions that are executable by the computer device 500, historical data, and any data that can be utilized by the methods and systems of the present disclosure. The memory 510 can include random access memory (RAM), read only memory (ROM), flash memory, or any other suitable memory systems. The memory 510 can be a volatile memory unit or units, and/or a non-volatile memory unit or units. The memory 510 may also be another form of computer-readable medium, such as a magnetic or optical disk.

Still referring to FIG. 5, a storage device 511 can be adapted to store supplementary data and/or software modules used by the computer device 500. For example, the storage device 511 can store historical data and other related data as mentioned above regarding the present disclosure. Additionally, or alternatively, the storage device 511 can store historical data similar to data as mentioned above regarding the present disclosure. The storage device 511 can include a hard drive, an optical drive, a thumb-drive, an array of drives, or any combinations thereof. Further, the storage device 511 can contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 509), perform one or more methods, such as those described above.

The system can be linked through the bus 550 optionally to a display interface or user Interface (HMI) 523 adapted to connect the system to a display device 525 and keyboard 524, wherein the display device 525 can include a computer monitor, camera, television, projector, or mobile device, among others.

Still referring to FIG. 5, the computer device 500 can include a user input interface 517 adapted to a printer interface (not shown) can also be connected through bus 550 and adapted to connect to a printing device (not shown), wherein the printing device can include a liquid inkjet printer, solid ink printer, large-scale commercial printer, thermal printer, UV printer, or dye-sublimation printer, among others.

The high-speed interface 512 manages bandwidth-intensive operations for the computing device 500, while the low-speed interface 513 manages lower bandwidth-intensive operations. Such allocation of functions is an example only. In some implementations, the high-speed interface 512 can be coupled to the memory 510, a user interface (HMI) 523, and to a keyboard 524 and display 525 (e.g., through a graphics processor or accelerator), and to the high-speed expansion ports 514, which may accept various expansion cards (not shown) via bus 550. In the implementation, the low-speed interface 513 is coupled to the storage device 511 and the low-speed expansion port 515, via bus 550. The low-speed expansion port 515, which may include various communication ports (e.g., USB, Bluetooth, Ethernet, wireless Ethernet) may be coupled to one or more input/output devices 505, and other devices a keyboard 524, a pointing device (not shown), a scanner (not shown), or a networking device such as a switch or router, e.g., through a network adapter.

Still referring to FIG. 5, the computing device 500 may be implemented in a number of different forms, as shown in the figure. For example, it may be implemented as a standard server 526, or multiple times in a group of such servers. In addition, it may be implemented in a personal computer such as a laptop computer 527. It may also be implemented as part of a rack server system 528. Alternatively, components from the computing device 500 may be combined with other components in a mobile device (not shown).

Features

Contemplated is that the optic, can include any combination of the different aspects listed below, wherein the optic includes an optical surface partitioned into a plurality of facets. Wherein a geometry of the plurality of facets are configured to rearrange the rays in an incident light field to form a desired irradiance pattern on a specified projection surface, partitioned into a plurality of pixels, each of which may receive light from a multiplicity of facets. Wherein the configured geometry of the plurality of facets is corrected to minimize a difference between an observed irradiance pattern and a desired irradiance pattern provided by a user.

Aspects of the present disclosure can include the optical surface is one of refractive, reflective or having a varying refractive index. Another aspect can be that the incident light field is identified as one of: directional radiant intensities that vary over a two dimensional (2D) surface, a list of light rays, a wavefront, a collection of mathematical radiance functions, or a plenoptic function. Further, an aspect may be that the desired irradiance pattern is specified by intensity values in an image that has been mapped onto the projection surface. Further still, an aspect can be that the partitioning of the optical surface into a plurality of facets is determined by conceptually imposing a grid on the optical surface, such that each cell of the grid contains one facet and defines an aperture through which a unique subset of rays in the light field propagates to the projection surface.

Aspects of the present disclosure can also include the projection surface is partitioned into a plurality of non-overlapping equal-area pixels. An aspect can be that the observed irradiance pattern is obtained by calculating, for each possible pairing of one optical surface facet and one projection surface pixel, the energy in the subset of the light field that irradiates the pixel through the facet, then, for each projection surface pixel, summing the energy that pixel receives through all facets. Wherein the irradiance error is calculated as the subtractive difference between the observed irradiance pattern and the desired irradiance pattern. Further, an aspect can be that the irradiance error identifies a correction configuration to be applied to configuring an initial geometry of the plurality of facets, that results in the configured geometries of the plurality of facets better forming the target irradiance pattern.

Aspects of the present disclosure can include the irradiance error is the result of a nonstationary convolution that mixes unwanted artifacts in the actual irradiance pattern that due to the light field and unwanted artifacts in the actual irradiance pattern that are due to incorrect shaping of the optic, such that the shape errors can be isolated via deconvolution and then corrected. Unwanted artifacts are defects in the actual irradiance pattern Wherein the light field convolution operator is represented by a matrix containing the paired facet-pixel irradiance energies, each scaled according to the geometry of the facet-pair path. Such that the unknown optical surface shape error is represented by a vector of unknown curvature corrections, one for each facet, and deconvolution is achieved by solving a system of linear equations for curvature-correction values that make the matrix-vector product most accurately reproduce the irradiance error, in a minimum squared error sense. Wherein the curvature corrections are applied to the optical surface by solving a two-dimensional Poisson problem for a field of height values whose local curvatures match the curvature correction values, then adding these height values to the field of height values that determine the shape of the optical surface. Wherein if a light source has near-zero étendue such that no two facets illuminate overlapping areas on the projection surface, the curvature corrections are calculated directly from the pixel irradiance errors.

Aspects of the present disclosure can include the optical surface is part of an optical path that includes additional optical elements such as lenses, mirrors, and baffles, producing optical phenomena such as partial occlusion, internal reflection, and Fresnel losses, the effects of which are absorbed into the irradiance simulations. An aspect can be that the optic is made of one of: a transparent optical polymer, a transparent glass, or a specular reflecting material. Further, an aspect can include the optic is a freeform lens or mirror manufactured by one of: molding, milling, lathing, 3D printing, electroforming, stereolithography, or mechanical forming. An aspect may be that the desired irradiance pattern reproduces any combination of: a photograph, a picture, a drawing, a graphic, a sign, or one or more symbols.

Aspects of the present disclosure can include the specified projection surface is an optical diffuser. An aspect may be that the specified projection surface is a curved surface. Further, an aspect can be that the specified projection surface is a virtual surface in 3D space that is focused by subsequent optics in an optical path. Further still, an aspect can be that the plurality of facets are arranged as a substantially smooth and continuous surface created by machining a face of a block of an optical material.

Contemplated is that the method forming an optic, can include any combination of the different aspects listed below, wherein method of forming an optic device, includes providing an optical surface having a plurality of facets with an initial geometry. Using a processor in communication with a memory, the processor is configured for determining a refraction or reflection of incident illumination from an incident light field through the plurality of facets with the initial geometry to create an observed irradiance pattern on a specified projection surface. Determining a shape of each facet of the plurality of facets that results in producing a target irradiance pattern on the specified projection surface correcting a difference between the observed irradiance pattern and a desired irradiance pattern provided by a user.

An aspect can further comprise using an output interface connected to the processor to send data to controller. Using an input interface of the controller to receive the data, wherein the controller is connected to a device, and sends the data via a transceiver to the device, such that the device is configured to change surfaces of optic surfaces. Receiving the data by the device, wherein the data includes the determine shape of each facet of the plurality of facets that results in producing the target irradiance pattern on the specified projection surface matching a desired irradiance pattern. Placing the optic surface inside the device by an operator, wherein the operator initiates the device into operation, wherein the device during the operation changes the initial geometry of each facet of the plurality of facets to the geometry of the determined shape, to obtain the target irradiance pattern on the specified projection surface matching the observed irradiance pattern and a desired irradiance pattern.

Definitions

The definitions provided are based upon knowledge gained through experimentation while developing some of the embodiments of the present disclosure.

Facet of the optical surface: Facets are flat faces on geometric shapes that reflect an underlying symmetry of the structure. The facet angles used for each facet play a crucial role in the final outcome of a structure, such that the angles of each facet must be carefully adjusted to maximize the optical performance. The angles used will vary based on the refractive index of the material. When light passes through a material and strikes a polished facet, the minimum angle possible for the facet to reflect the light back into the gemstone is called the critical angle.

Refractive index or index of refraction: A material is a dimensionless number that describes how fast light propagates through the material, which can be defined as $$n = \frac{c}{v},$$

where c is the speed of light in vacuum and v is the phase velocity of light in the medium. The refractive index can determine how much the path of light is bent, or refracted, when entering a material. Snell's law of refraction, $n_1 \sin \theta_1 = n_2 \sin \theta_2$, is where $\theta_1$ and $\theta_2$ are the angles of incidence and refraction, respectively, of a ray crossing the interface between two media with refractive indices $n_1$ and $n_2$. The refractive indices also determine the amount of light that is reflected when reaching the interface, as well as the critical angle for total internal reflection.

Total Internal Reflection:

A phenomenon which occurs when a propagated wave strikes a medium boundary at an angle larger than a particular critical angle with respect to the normal to the surface. If the refractive index is lower on the other side of the boundary and the incident angle is greater than the critical angle, the wave cannot pass through and is entirely reflected.

Critical Angle:

An angle of incidence above which the total internal reflection occurs, which can be an optical phenomenon, in regard to light waves.

Incident Ray:

A ray of light that strikes a surface. The angle between this ray and the perpendicular or normal to the surface is the angle of incidence. The reflected ray corresponding to a given incident ray, is the ray that represents the light reflected by the surface. The angle between the surface normal and the reflected ray is the angle of reflection. The Law of Reflection says that for a specular (non-scattering) surface, the angle of reflection always equals the angle of incidence.

Light Field:

A light field is a description of all the light propagating in a volume of space. For example, given a light field that describes all of the of the rays passing through a window, one should be able to compute the image produced by a camera or telescope placed at any position and orientation near that window. If one were to design a freeform optic to work with a nontrivial light source or as part of a nontrivial optical path that contains other optical elements, the light incident on the freeform would be described as a light field. Further, a vector function that describes the amount of light flowing in every direction through every point in space. The space of all possible light rays is given by the five-dimensional plenoptic function, and the magnitude of each ray is given by the radiance. A vector-valued function, also referred to as a vector function, is a mathematical function of one or more variables whose range is a set of multidimensional vectors or infinite-dimensional vectors. The input of a vector-valued function could be a scalar or a vector (that is, the dimension of the domain could be 1 or greater than 1); the dimension of the domain is not defined by the dimension of the range.

103. Deconvolution in a curvature domain: In regard to optics and imaging, the term "deconvolution" can be used to refer to the process of reversing the optical distortion that takes place in an optical microscope, electron microscope, telescope, or other imaging instrument, thus creating clearer images. Which can be done in the digital domain via a software algorithm, as part of some microscope image processing techniques. For example, this approach can assume that the optical path through the instrument is optically perfect, convolved with a point spread function (PSF), that is, a mathematical function that describes the distortion in terms of the pathway a theoretical point source of light (or other waves) takes through the instrument. Usually, such a point source contributes a small area of fuzziness to the final image. If this function can be determined, it is then a matter of computing its inverse or complementary function, and convolving the acquired image with that. The result is the original, undistorted image.

Étendue:

A measure of the entropy of the beam, and can be understood as the average amount of uncertainty about the direction of light through any point of space. For example, a collimated beam has zero étendue, because all rays are traveling in parallel in the same direction.

Optical Phenomena—Fresnel Losses:

Losses that takes place at any discontinuity of refractive index, especially at an air-glass interface such as a lens surface, at which a fraction of the optical energy is reflected back toward the source instead of refracted forward. This reflection phenomenon can be called "Fresnel reflection loss," or "Fresnel loss."

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments.

However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. An optic, comprising:
    an optical surface partitioned into a plurality of facets, wherein a geometry of the plurality of facets are configured to rearrange the rays of light in an incident light field to form a desired irradiance pattern on a projection surface, partitioned into a plurality of pixels, each of which may receive light from a multiplicity of facets, wherein the configured geometry of the plurality of facets is corrected to minimize a difference between an observed irradiance pattern and a desired irradiance pattern provided by a user,
    wherein an irradiance error is calculated as the subtractive difference between the observed irradiance pattern and the desired irradiance pattern, such that the irradiance error identifies a correction configuration to be applied to configuring an initial geometry of the plurality of facets, that results in the configured geometries of the plurality of facets better forming the target irradiance pattern.

2. The optic of claim 1, wherein the optical surface is one of refractive, reflective or having a varying refractive index.

3. The optic of claim 1, wherein the incident light field is identified as one of:
    directional radiant intensities that vary over a two dimensional (2D) surface, a list of light rays, a wavefront, a collection of mathematical radiance functions, or a plenoptic function.

4. The optic of claim 1, wherein the desired irradiance pattern is specified by intensity values in an image that has been mapped onto the projection surface.

5. The optic of claim 1, wherein the partitioning of the optical surface into the plurality of facets is determined by conceptually imposing a grid on the optical surface, such that each cell of the grid contains one facet and defines an aperture through which a unique subset of rays in the light field propagates to the projection surface.

6. The optic of claim 1, wherein the observed irradiance pattern is obtained by calculating, for each possible pairing of one optical surface facet and one projection surface pixel, the energy in the subset of the light field that irradiates the pixel through the facet, then, for each projection surface pixel, summing the energy that pixel receives through all facets.

7. The optic of claim 1, wherein the irradiance error is the result of a nonstationary convolution that mixes unwanted artifacts due to the light field and unwanted artifacts due to incorrect shaping of the optic, such that the shape errors can be isolated via deconvolution and then corrected.

8. The optic of claim 7, wherein a light field convolution operator is represented by a matrix containing paired facet-pixel irradiance energies, each scaled according to a geometry of a facet-pair path, and wherein an unknown optical surface shape error is represented by a vector of unknown curvature corrections, one for each facet, and a deconvolution is achieved by solving a system of linear equations for curvature-correction values that make a matrix-vector product most accurately reproduce the irradiance error, in a minimum squared error sense.

9. The optic of claim 8, wherein the curvature corrections are applied to the optical surface by solving a two-dimensional Poisson problem for field of height values whose local curvatures match the curvature correction values, then the height values are added to the field of height values that determine the shape of the optical surface.

10. The method of claim 8, wherein when a light source has near-zero étendue such that no two facets illuminate overlapping areas on the projection surface, the curvature corrections are calculated directly from the pixel irradiance errors.

11. The optic of claim 1, wherein the optical surface is part of an optical path that includes additional optical elements such as lenses, mirrors, and baffles, producing optical phenomena such as partial occlusion, internal reflection, and Fresnel losses, the effects of which are absorbed into the irradiance simulations.

12. The optic of claim 1, wherein the optic is made of one of a transparent optical polymer, a transparent glass or a specular reflecting material.

13. The optic of claim 1, wherein the optic is a freeform lens or mirror manufactured by one of molding, milling, lathing, 3D printing, electroforming, stereolithography or mechanical forming.

14. The optic of claim 1, wherein the desired irradiance pattern reproduces any combination of a photograph, a picture, a drawing, a graphic, a sign or one or more symbols.

15. The optic of claim 1, wherein the projection surface is partitioned into a plurality of non-overlapping equal-area pixels, and is one of an optical diffuser, a curved surface or the projection surface is a virtual surface in 3D space that is focused by subsequent optics in an optical path.

16. An optic, comprising:
an optical surface partitioned into a plurality of facets, wherein the partitioning of the optical surface into the plurality of facets is determined by conceptually imposing a grid on the optical surface, such that each cell of the grid contains one facet and defines an aperture through which a unique subset of rays in the light field propagates to a projection surface, and the projection surface is partitioned into a plurality of non-overlapping equal-area pixels, and
wherein a geometry of the plurality of facets are configured to rearrange the rays of light in an incident light field to form a desired irradiance pattern on the projection surface, partitioned into the plurality of non-overlapping equal-area pixels, each of which may receive light from a multiplicity of facets, such that the configured geometry of the plurality of facets is corrected to minimize a difference between an observed irradiance pattern and a desired irradiance pattern provided by a user, and that the desired irradiance pattern is specified by intensity values in an image that has been mapped onto the projection surface,
wherein an irradiance error is calculated as the subtractive difference between the observed irradiance pattern and the desired irradiance pattern, such that the irradiance error identifies a correction configuration to be applied to configuring an initial geometry of the plurality of facets, that results in the configured geometries of the plurality of facets better forming the target irradiance pattern.

17. A method of forming an optic device, comprising:
providing an optical surface having a plurality of facets with an initial geometry;
using a processor in communication with a memory, the processor is configured for
  determining a refraction or reflection of incident illumination from an incident light field through the plurality of facets with the initial geometry to create an observed irradiance pattern on a specified projection surface;
  determining a shape of each facet of the plurality of facets that results in producing a target irradiance pattern on the specified projection surface correcting a difference between the observed irradiance pattern and a desired irradiance pattern provided by a user;
using an output interface connected to the processor to send data to a controller;
using an input interface of the controller to receive the data, wherein the controller is connected to a device, and sends the data via a transceiver to the device, such that the device is configured to change surfaces of optic surfaces;
receiving the data by the device, wherein the data includes the determine shape of each facet of the plurality of facets that results in producing the target irradiance pattern on the specified projection surface matching a desired irradiance pattern.

* * * * *